United States Patent
Palekar et al.

(10) Patent No.: US 9,417,812 B1
(45) Date of Patent: Aug. 16, 2016

(54) METHODS AND APPARATUS FOR MINIMALLY DISRUPTIVE DATA MIGRATION

(75) Inventors: Ashish Arun Palekar, Franklin, MA (US); Sudhindra Swayampakulaa, Milford, MA (US); Karunaker Chinthapatla, Marlborough, MA (US); Matthew D. Waxman, Waltham, MA (US)

(73) Assignee: EMC CORPORATION, Hopkinton, MA (US)

( * ) Notice: Subject to any disclaimer, the term of this patent is extended or adjusted under 35 U.S.C. 154(b) by 857 days.

(21) Appl. No.: 11/964,364

(22) Filed: Dec. 26, 2007

(51) Int. Cl.
  *G06F 12/00* (2006.01)
  *G06F 3/06* (2006.01)

(52) U.S. Cl.
  CPC ............ *G06F 3/0647* (2013.01); *G06F 3/0607* (2013.01); *G06F 3/0683* (2013.01)

(58) Field of Classification Search
  CPC .... G06F 3/0683; G06F 3/0647; G06F 3/0607
  USPC ......................................................... 711/162
  See application file for complete search history.

(56) References Cited

U.S. PATENT DOCUMENTS

| | | | | |
|---|---|---|---|---|
| 6,976,103 | B1 * | 12/2005 | Watanabe et al. | 710/74 |
| 7,130,941 | B2 * | 10/2006 | Okada et al. | 710/74 |
| 7,149,859 | B2 * | 12/2006 | Fujibayashi | 711/162 |
| 7,343,467 | B2 * | 3/2008 | Brown et al. | 711/203 |
| 7,840,723 | B1 * | 11/2010 | Kemkar | 710/36 |
| 2004/0250021 | A1 * | 12/2004 | Honda et al. | 711/114 |
| 2006/0282631 | A1 * | 12/2006 | Helliker | 711/162 |
| 2007/0050569 | A1 * | 3/2007 | Haustein et al. | 711/154 |
| 2009/0089498 | A1 * | 4/2009 | Hay | 711/112 |

OTHER PUBLICATIONS

Mike Dutch, SCSI.doc, May 2002,dutch.space4.home.comcast. net/~dutch.space4/scsi.pdf.*

* cited by examiner

*Primary Examiner* — Kalpit Parikh
(74) *Attorney, Agent, or Firm* — Daly, Crowley, Mofford & Durkee, LLP

(57) ABSTRACT

Methods and apparatus for migrating data with minimal disruption in a storage virtualization system. In one embodiment, a method includes collecting information on a backend logical unit (LUN) having a direct path from a host, presenting the backend LUN to the host through a virtual target via the storage virtualization application, disconnecting the direct path from the host to the backend LUN so that the backend LUN is accessed by the host via the storage virtualization application transparently to the host, and migrating data from the backend LUN to a destination storage transparently to the host.

20 Claims, 21 Drawing Sheets

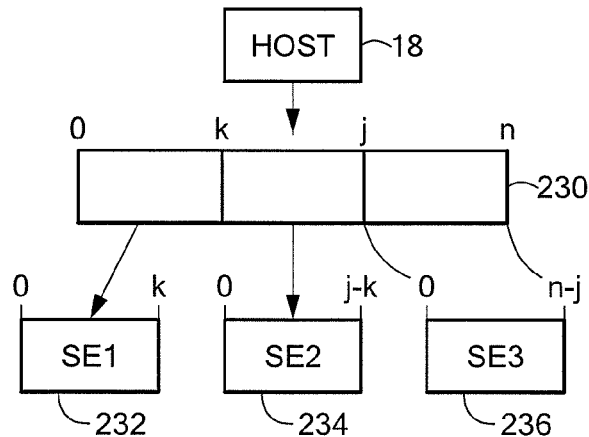
*FIG. 12*
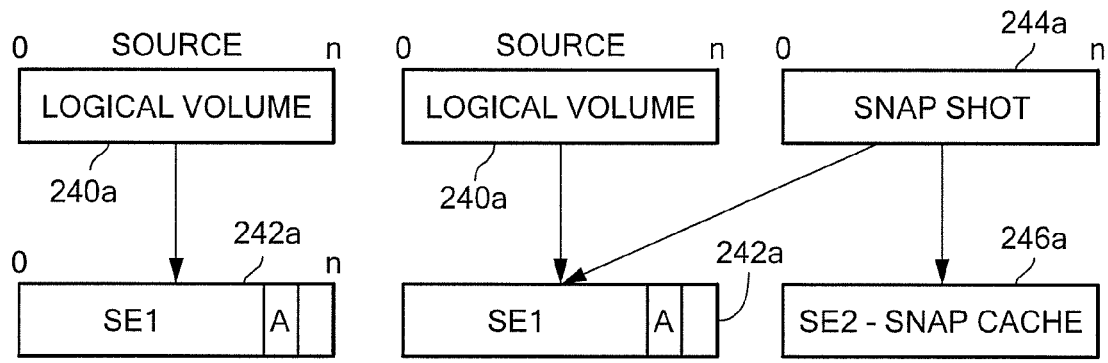
*FIG. 13*     *FIG. 14*
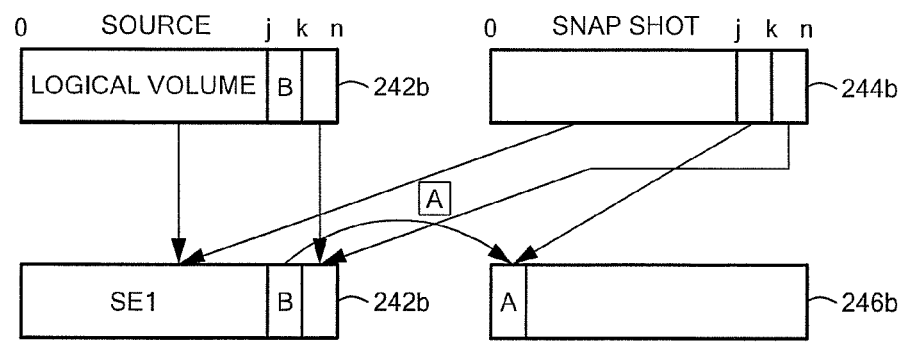
*FIG. 15*

METHODS AND APPARATUS FOR MINIMALLY DISRUPTIVE DATA MIGRATION

BACKGROUND OF THE INVENTION

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

To leverage the value of MSS, these are typically networked in some fashion, Popular implementations of networks for MSS include network attached storage (NAS) and storage area networks (SAN). In NAS, MSS is typically accessed over known TCP/IP lines such as Ethernet using industry standard file sharing protocols like NFS, HTTP, and Windows Networking. In SAN, the MSS is typically directly accessed over Fibre Channel switching fabric using encapsulated SCSI protocols.

To enhance the user experience with storage systems, storage virtualization applications abstract storage available to the user. For example, storage arrays from a variety of vendors can be used transparently to the user. One feature of such systems, such as the INVISTA system by EMC Corporation, includes data migration from source storage to destination storage. Data migration can require down time to perform the migration. As will be readily appreciated, it is desirable to reduce the amount of down time for data migration and to make it easy for users to perform data migrations.

SUMMARY OF THE INVENTION

The present invention provides methods and apparatus for a storage virtualization to migrate data from source storage to destination storage with minimal disruption transparently to the host. With this arrangement, data can be migrated using a storage virtualization application without software being added to the host with the use of 'pass through' logical units. While exemplary embodiments of the invention are shown and described in conjunction with particular configurations, components, and storage, it is understood that the invention is applicable to storage systems in general for which it is desirable to migrate data from a first storage to a second storage.

In one aspect of the invention, a method comprises migrating data in a storage virtualization environment having a storage virtualization application, including collecting information on a backend logical unit (LUN) having a direct path from a host, presenting the backend LUN to the host through a virtual target via the storage virtualization application, disconnecting the direct path from the host to the backend LUN so that the backend LUN is accessed by the host via the storage virtualization application transparently to the host, and migrating data from the backend LUN to a destination storage transparently to the host.

The method can further include one or more of the following features: the backend LUN is identified with the same unique ID for both the direct path to the host and the virtual target, collecting information includes static information collection, collecting information includes information collection through monitoring, collecting information includes self-learning where the storage virtualization application functions as a pass through to the backend LUN, persistently storing the collected information on the backend LUN, utilizing, after the backend LUN is disconnected, the collected information on the backend LUN to present to the host a personality identical to that of the prior storage and writing data to the destination storage, collecting the information on the backend logical unit (LUN) by a virtual initiator, removing the backend LUN after completion of the data migration to the destination storage, moving the destination storage to a remote location, during the data migration, mirroring writes to the backend LUN and the destination storage and servicing reads only through the backend LUN, and retaining a personality of the backend LUN until cleared by a user.

In another aspect of the invention, an article comprises a computer readable medium having stored instructions to enable a machine to perform the steps of: migrating data in a storage virtualization environment having a storage virtualization application, including collecting information on a backend logical unit (LUN) having a direct path from a host, presenting the backend LUN to the host through a virtual target via the storage virtualization application, disconnecting the direct path from the host to the backend LUN so that the backend LUN is accessed by the host via the storage virtualization application transparently to the host, and migrating data from the backend LUN to a destination storage transparently to the host.

In a further aspect of the invention, a system comprises a storage virtualization application having a data migration module to collect information on a backend logical unit (LUN) having a direct path from a host for presenting the backend LUN to the host through a virtual target via the storage virtualization application, and disconnecting the direct path from the host to the backend LUN so that the backend LUN is accessed by the host via the storage virtualization application transparently to the host to enable migration of data from the backend LUN to a destination storage transparently to the host.

BRIEF DESCRIPTION OF THE DRAWINGS

The above and further advantages of the present invention may be better under stood by referring to the following description taken into conjunction with the accompanying drawings in which:

FIG. 12 shows an example of Virtualization Mapping from Logical Volume to Physical Storage employed in the Data Storage Environment of FIG. 1;

FIG. 13 shows an example of SNAP Processing employing another example of the Virtualization Mapping and showing before a SNAP occurs;

FIG. 14 shows another example of SNAP Processing employing the Virtualization Mapping of FIG. 12 and showing after a SNAPSHOT occurs but BEFORE a WRITE has taken place;

FIG. 15 shows another example of SNAP Processing employing the Virtualization Mapping of FIG. 12 and showing after a SNAPSHOT occurs and AFTER a WRITE has taken place;

DETAILED DESCRIPTION

The methods and apparatus of the present invention are intended for use in Storage Area Networks (SANs) that include data storage systems, such as the Symmetrix Integrated Cache Disk Array system or the Clariion Disk Array system available from EMC Corporation of Hopkinton, Mass. and those provided by vendors other than EMC.

The methods and apparatus of this invention may take the form, at least partially, of program code (i.e., instructions) embodied in tangible media, such as floppy diskettes, CD-ROMs, hard drives, random access or read only-memory, or any other machine-readable storage medium, including transmission medium. When the program code is loaded into and executed by a machine, such as a computer, the machine becomes an apparatus for practicing the invention. The methods and apparatus of the present invention may be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code (software-based logic) for carrying out the method is embodied as part of the system described below.

OVERVIEW

The embodiment of the present invention denominated as FabricX architecture allows storage administrators to manage the components of their SAN infrastructure without interrupting the services they provide to their clients. This provides for a centralization of management allowing the storage infrastructure to be managed without requiring host-based software or resources for this management. For example, data storage volumes can be restructured and moved across storage devices on the SAN while the hosts accessing these volumes continue to operate undisturbed.

Architecture

Figure 1:
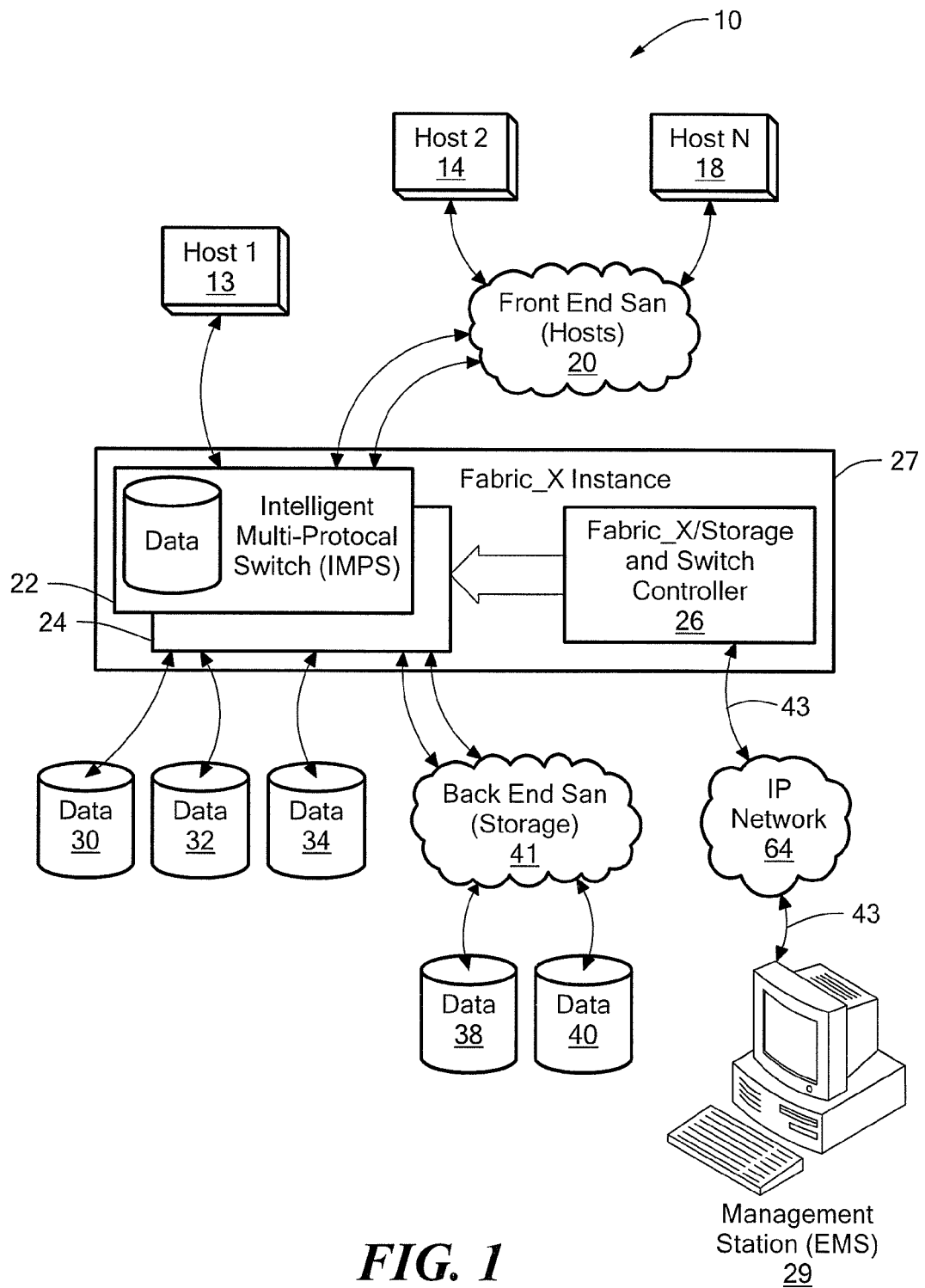
FIG. 1 is a block diagram showing a Data Storage environment including a new architecture embodying the present invention and which is useful in such an environment.

Referring now to FIG. 1, reference is now made to a data storage environment 10 including an architecture including the elements of the front-end storage area network 20 and a plurality of hosts 1-N shown as hosts 13, 14, and 18, wherein some hosts may communicate through the SAN and others may communicate in a direct connect fashion, as shown. The architecture includes two intelligent multi-protocol switches (IMPS's) 22 and 24 and storage and switch controller 26 to form a combination 27 which may also be denominated as a FabricX Instance 27. In communication with the Instance through an IP Network 64 and management interface 43 is an element management station (EMS) 29, and back-end storage network 42. Such back-end storage may include one or more storage systems, such as the EMC CLARiiON and Symmetrix data storage systems from EMC of Hopkinton, Mass.

Generally such a data storage system includes a system memory and sets or pluralities of multiple data storage devices or data stores. The system memory can comprise a buffer or cache memory; the storage devices in the pluralities and can comprise disk storage devices, optical storage devices and the like. However, in a preferred embodiment the storage devices are disk storage devices. The sets represent an array of storage devices in any of a variety of known configurations. In such a data storage system, a computer or host adapter provides communications between a host system and the system memory and disk adapters and provides pathways between the system memory and the storage device pluralities. Regarding terminology related to the preferred data storage system, the host or host network is sometimes referred to as the front end and from the disk adapters toward the disks is sometimes referred to as the back end. Since the invention includes the ability to virtualize disks using LUNs as described below, a virtual initiator may be interchanged with disk adapters. A bus interconnects the system memory, and communicates with front and back end. As will be described below, providing such a bus with switches provides discrete access to components of the system.

Referring again to FIG. 1, the Data Storage Environment 10 provides architecture in a preferred embodiment that includes what has been described above as a FabricX Instance. Pairs of the IMPS switch are provided for redundancy; however, one skilled in the art will recognize that more or less switches and processors could be provided without limiting the invention and that the Controller could also be provided in redundancy. Storage from various storage subsystems is connected to a specific set of ports on an IMPS. As illustrated, the imported storage assets and these back-end ports make up the Back-End SAN 41 with a networked plurality of data storage arrays 38, and 40, and which also may be directly connected to either IMPS, as shown with arrays 30 34 so connected to the Instance 27 through IMPS 24, but although not shown could also be connected directly to the Storage and Switch Controller.

It is known in SAN networks using Fibre Channel and/or SCSI protocols that such data devices as those represented by disks or storage 30 40 can be mapped using a protocol to a Fibre Channel logical unit (LUN) that act as virtual disks that may be presented for access to one or more hosts, such as hosts 13 18 for I/O operations. LUN's are also sometimes referred to interchangeably with data volumes which at a logical level represent physical storage such as that on storage 30 40.

Over the referred IP Network 64 and by communicating through the management interface 43, a Storage Administrator using the EMS 29 may create virtual LUN's (Disks) that are composed of elements from the back-end storage. These virtual devices which may be represented, for example by a disk icon (not shown) grouped with the intelligent switch, are made available through targets created on a specific set of intelligent switch ports. Client host systems connect to these 'front-end' ports to access the created volumes. The client host systems, the front-end ports, and the virtual LUN's all form part of the Front-End SAN 20. Note Hosts, such as Host 13 may connect directly to the IMPS.

The combined processing and intelligence of the switch and the FabricX Controller provide the connection between the client hosts in the front-end SAN and the storage in the back-end SAN. The FabricX Controller runs storage applications that are presented to the client hosts. These include the Volume Management, Data Mobility, Snapshots, Clones, and Mirrors, which are terms of art known with EMC's Clariion data storage system. In a preferred embodiment the FabricX Controller implementation is based on the CLARiiON Barracuda storage processor and the CLARiiON Flare software implementation which includes layered drivers that are discussed below.

Hardware Components

Figure 2:
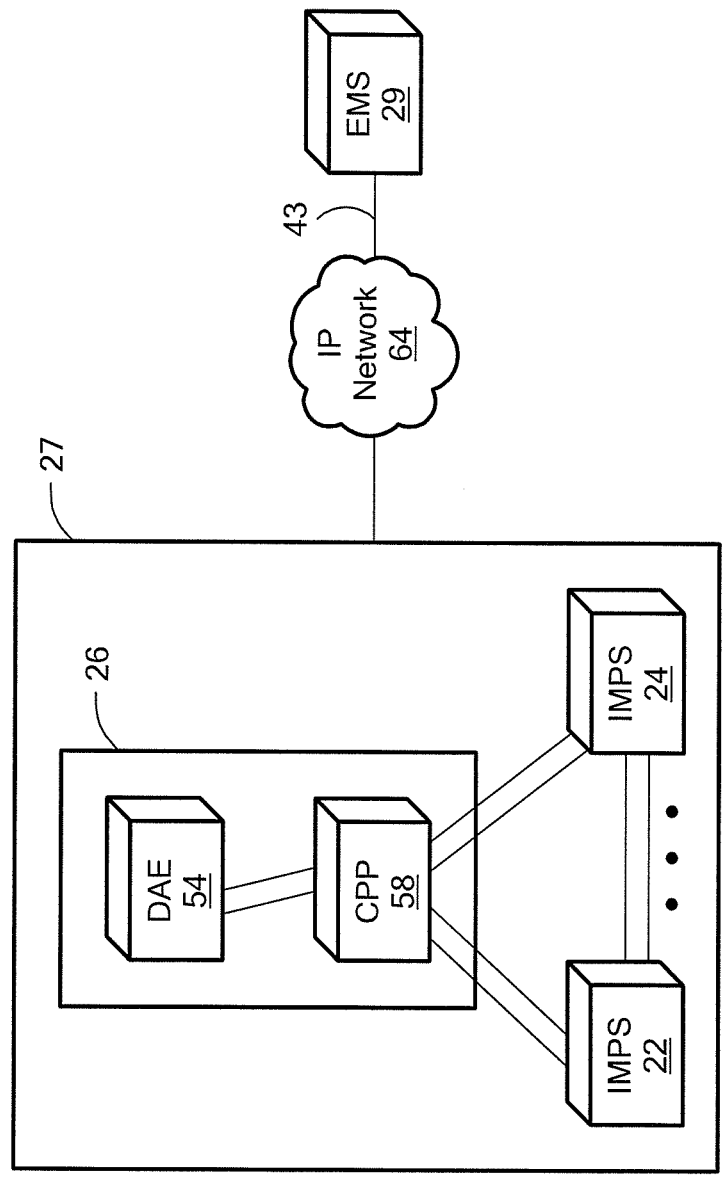
FIG. 2 is another block diagram showing hardware components of the architecture shown in FIG. 1.

Referring to FIG. 2, hardware components of the architecture in the environment shown in FIG. 1 are now described in detail. A FabricX instance 27 is comprised of several discrete hardware subsystems that are networked together. The major subsystems include a Control Path Processor (CPP) 58 and a Disk Array Enclosure (DAE) 54, each described in more detail in FIGS. 3 and 4.

The CPP provides support for storage and switch software applications and runs the software that handles exceptions that occur on the fast-path. Regarding where software runs, in the exemplary embodiment, software for management by the Storage and Switch Controller is shown running on the CPP; however, that is merely an example and any or all software may be loaded and run from the IMPS or anywhere in the networked environment. Additionally the CPP supports management interfaces used to configure and control the instance. The CPP is composed of redundant storage processors and is further described with reference to FIG. 3.

In one embodiment, the DAE, together with the disks that it contains provide the persistent storage of the meta-data for the FabricX instance. The meta data includes configuration information that identifies the components of the instance, for example, the identities of the intelligent switches that make up the instance, data describing the set of exported virtual volumes, the software for the Controller, information describing what hosts and initiators are allowed to see what volumes, etc. The DAE is further described with reference to FIG. 4. The IMPS 22 or 24 provide storage virtualization processing in the data-path (also known as fast-path processing), and pass control to the CPP when exceptions occur for requests that it cannot handle. In other embodiments, the metadata is stored in other locations, such as on the network.

Referring to FIG. 2, each FabricX instance may be managed by an administrator or user using EMS 29. Preferably, a given EMS is capable of managing one or more FabricX instances and communicates to the FabricX instance components through one or more IP networks.

Figure 3:
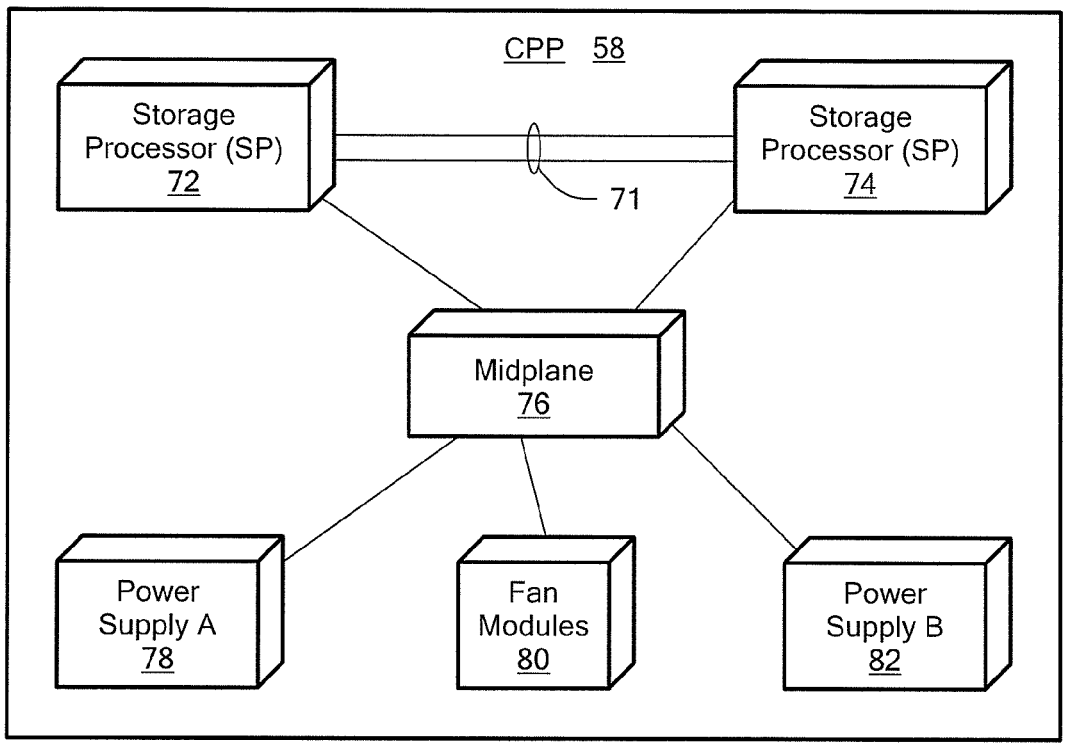
FIG. 3 is another block diagram showing hardware components of a processor included in the architecture and components of respective FIGS. 1 and 2.

Referring to FIG. 3, CPP 58 preferably includes two storage processors (SP's) 72 and 74, which may be two Intel Pentium IV microprocessors or similar. The two storage processors in the CPP communicate with each other via links 71, which may be for example redundant 2 Gbps Fibre Channel links, each provided in communication with the mid-plane 76. Each CPP contains fan modules 80 that connect directly to the mid-plane 76. The CPP contains two power supplies 78 and 82 (Power Supply A and B). In a preferred embodiment, the power supplies are redundant, have their own line cord, power switch, and status light, and each power supply is capable of providing full power to the CPP and its DAE. During normal operation the power supplies share load current. These redundant standby power supplies provide backup power to the CPP to ensure safety and integrity of the persistent meta-data maintained by the CPP.

Figure 4:
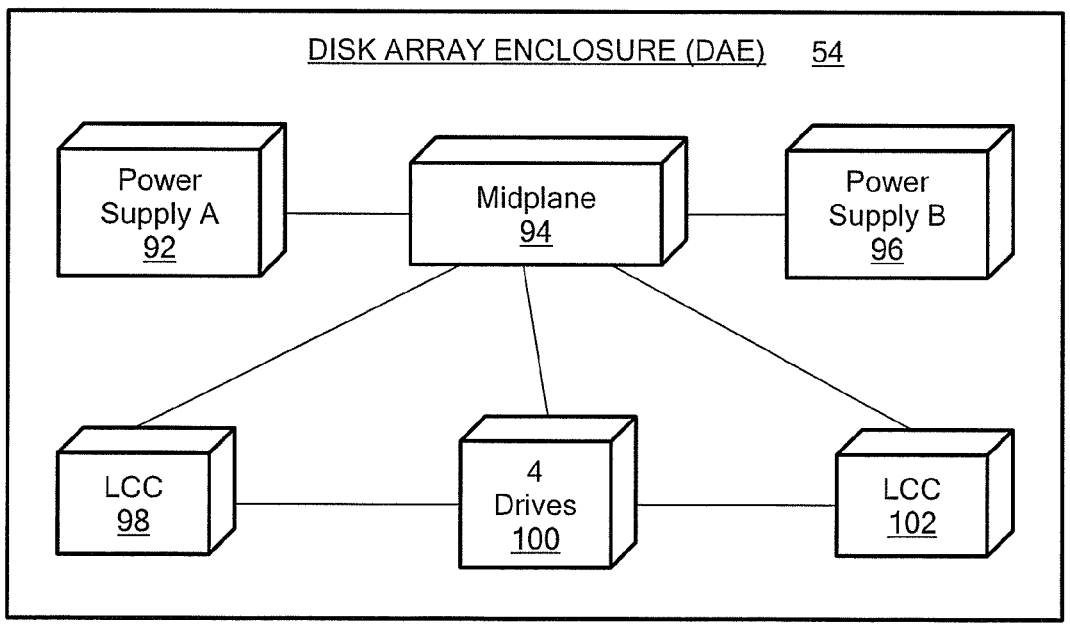
FIG. 4 is another block diagram showing hardware components of a disk array included in the architecture and components of respective FIGS. 1 and 2.
Figure 5:
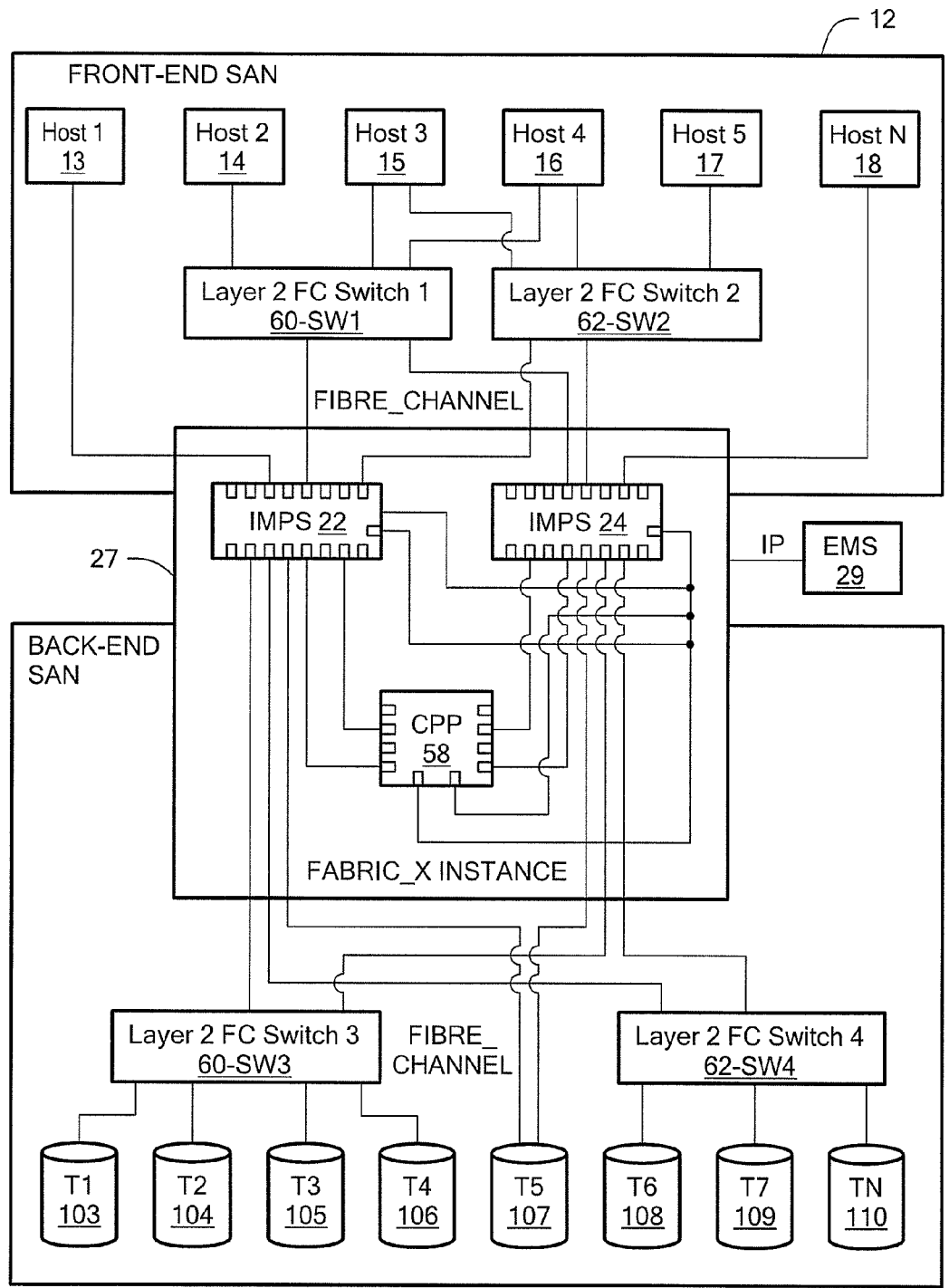
FIG. 5 is a schematic illustration of the architecture and environment of FIG. 1.

Referring to FIG. 4, the DAE 54 is shown. A FabricX instance 27 preferably has a single DAE 54, which is loaded with four disk drives 100 (the number of drives is a variable choice, however). These disk drives provide the persistent storage for meta-data of the instance, wherein the meta-data is used for certain management and control functions. None of this storage is directly accessible or visible to hosts on the front-end. The meta-data on the disk drives is three-way mirrored to provide protection from disk failures. Each SP has a single arbitrated loop that provides its connection to the DAE. Each Link Control Card or LCC 98 and 102 connects the FabricX SP's to the meta-data storage devices or disk drives within the Disk Array Enclosure FIG. 5 shows a schematic illustration of the architecture and environment of FIG. 1 in detail with preferred connectivity and in a preferred two IMPS configuration (IMPS 22 and IMPS 24). Host Systems 13 18 preferably communicate with FabricX via a SCSI protocol running over Fibre Channel. Each Fibre Channel port of each IMPS is distinguished as being either a front-end port, a back-end port, a control-port, or an inter-switch port. Hosts connect to the FabricX instance 27 via front-end ports. Front-end ports support SCSI targets and preferably have virtualizing hardware to make up an intelligent port. The host's connection to the port may be direct as in the case of labeled Host 1 or indirect such as Host 2 via layer 2 Fibre Channel switches such as Switch 60-SW1 and Switch 62-SW2. Hosts may establish multiple paths to their storage by connecting to two or more separate front-end ports for high availability and performance; however, the preferred FabricX instance architecture allows hosts to be configured with a single path for the sake of simplicity. In some configurations, not shown for simplicity, the switches 60-SW1 and 62-SW2 could be combined and/or integrated with the IMPS without departing from the spirit of the invention.

An IMPS can be used to support virtual SANs (VSANs), to parse between front-end SANs and back-end SANs even if such SANs are not physically configured. In general, switches that support VSANs allow a shared storage area network to be configured into separate logical SANs providing isolation between the components of different VSANs. The IMPS itself may be configured in accordance with specifications from such known switch vendors as Brocade and Cisco.

Each intelligent switch preferably contains a collection of SCSI ports, such as Fibre Channel, with translation processing functions that allow a port or associated hardware to make various transformations on the SCSI command stream flowing through that port. These transformations are performed at near wire-speeds and hence have little impact on the latency of the command. However, intelligent ports are only able to make translations on READ and WRITE commands. For other SCSI commands, the port blocks the request and passes control for the request to a higher-level control function. This process is referred to as faulting the request. Faulting also occurs for read and write commands when certain conditions exist within the port. For example, a common transformation performed by an intelligent port is to map the data region of a virtual volume presented to a host to the data regions of back-end storage elements. To support this, the port maintains data that allows it to translate (map) logical block addresses of the virtual volume to logical back-end addresses on the back-end devices. If this data is not present in the port when a read or write is received, the port will fault the request to the control function. This is referred to as a map fault.

Once the control function receives a faulted request it takes whatever actions necessary to respond to the request (for example it might load missing map data), then either responds directly to the request or resumes it. The control function supported may be implemented differently on different switches. On some vendor's switches the control function is known to be supported by a processor embedded within the blade containing the intelligent ports, on others it is known to provide it as an adjunct processor which is accessed via the backplane of the switch, a third known configuration is to support the control function as a completely independent hardware component that is accessed through a network such as Fibre Channel or IP.

Back-end storage devices connect to FabricX via the Fibre Channel ports of the IMPSs that have been identified as back-end ports (oriented in FIG. 5 toward the back-end SAN). Intelligent ports act as SCSI initiators and the switch routes SCSI traffic to the back-end targets 103 110 respectively labeled T1 TN through the back-end ports of the respective IMPS's. The back-end devices may connect directly to a back-end IMPS if there is an available port as shown by T5, or they may connect indirectly such as in the case of T1 via a layer 2 Fibre Channel switch, such as Switch 60-SW3, and Switch 62-SW4.

The EMS 29 connects to FabricX in a preferred embodiment through an IP network, e.g. an Ethernet network which may be accessed redundantly. The FabricX CPP 58 in a preferred embodiment has two 10/100 Mbps Ethernet NIC that is used both for connectivity to the IMPS (so that it can manage the IMPS and receive SNMP traps), and for connectivity to the EMS. It is recommended that the IP networks $624a\ b$ provided isolation and dedicated 100 Mbps bandwidth to the IMPS and CPP.

The EMS in a preferred embodiment is configured with IP addresses for each Processor 72 74 in the FabricX CPP. This allows direct connection to each processor. Each Processor preferably has its own Fibre Channel link that provides the physical path to each IMPS in the FabricX instance. Other connections may also work, such as the use of Gigabit Ethernet control path connections between the CPP and IMPS. A logical control path is established between each Processor of the CPP and each IMPS. The control paths to IMPS's are multiplexed over the physical link that connects the respective SP of the CPP to its corresponding IMPS. The IMPS provides the internal routing necessary to send and deliver Fiber Channel frames between the SP of the CPP and the respective IMPS. Other embodiments are conceivable that could use IP connectivity for the control path. In such a case the IMPS could contain logic to route IP packets to the SP.

Software Components

Figure 6:
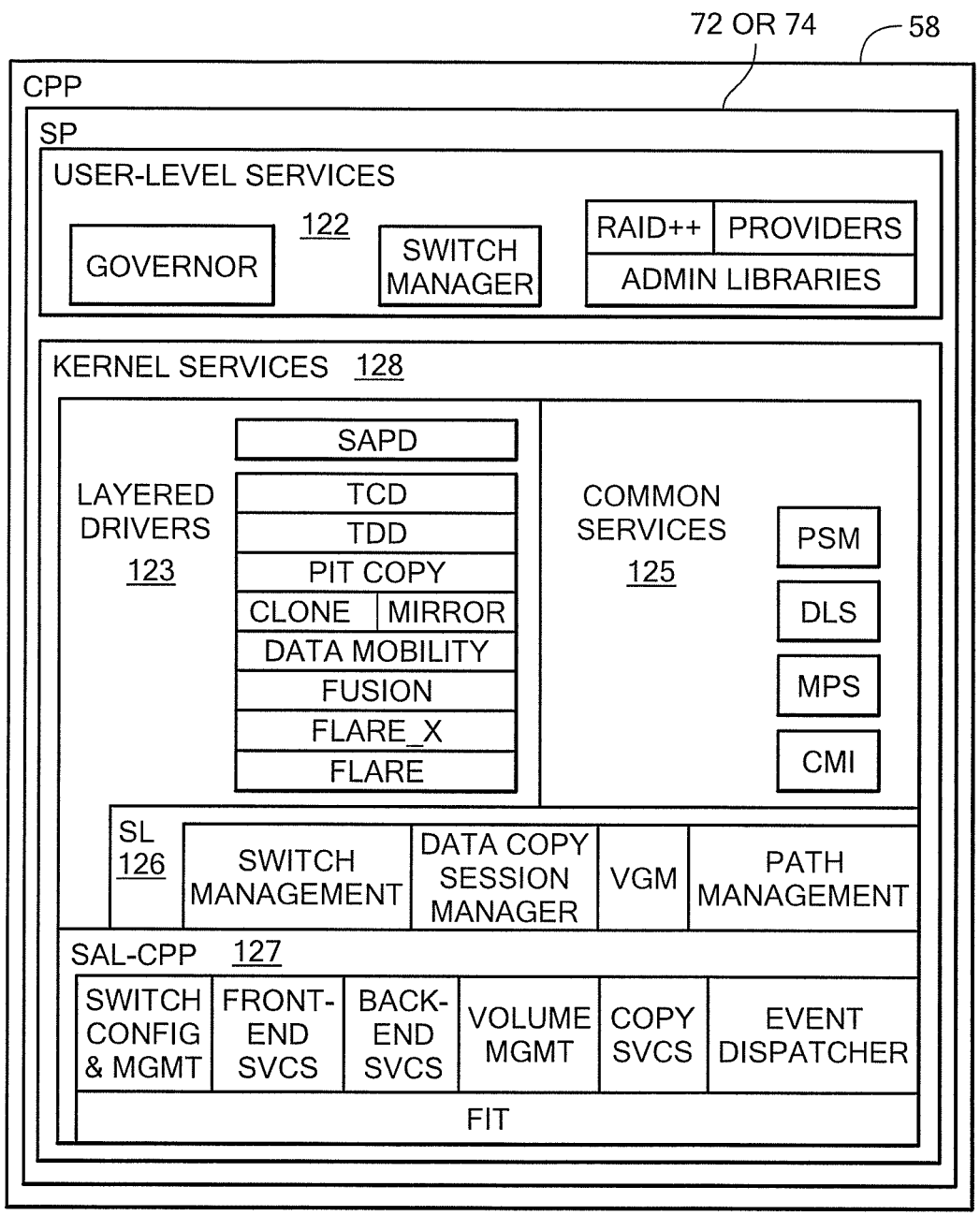
FIG. 6 is a functional block diagram showing software components of the processor shown in FIG. 3.
Figure 7:
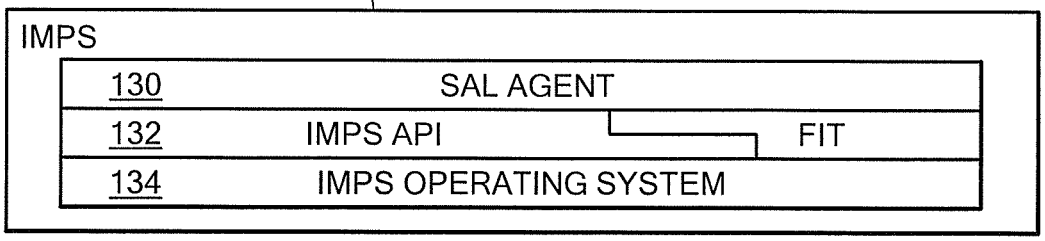
FIG. 7 is a functional block diagram showing software components of intelligent switches which are included in the architecture of FIG. 1 and which are also shown in the hardware components of FIG. 2.

Reference is made to FIGS. 6 and 7, showing a functional block diagram of software comprised in modules that run on the Storage Processors (SP) 72 or 74 within Control Path Processor (CPP) 58 and on the IMPS owned by the instance. Each of these storage processors operates as a digital computer preferably running Microsoft Window XP Embedded and hosts software components. Software Components of each SP are now described.

The CPP-based software includes a mixture of User-Level Services 122 and Kernel-mode or Kernel services 128. The Kernel services include Layered Drivers 123, Common Services 125, Switch Independent Layer (SIL) 126, and Switch Abstraction Layer-Control Path Processor (SAL-CPP) 127. The IMPS-based software preferably runs on a control processor within the vendor's switch. This processor may be embedded on an I/O blade within the switch or implemented as a separate hardware module.

The SAL-CPP 127 provides a vendor-independent interface to the services provided by the IMPS's that form a FabricX instance. This software layer creates and manages a IMPS Client for each IMPS that is part of the FabricX instance. The following services are provided by the SAL-CPP. There is a Switch Configuration and Management Services (SWITCH CONTIG MGMT) in the SAL-CPP that provides uniform support for configuring the IMPS, zone configuration and management, name service configuration and management, discovering the ports supported by the IMPS, reporting management related events such as Registered State Change Notifications (RSCNs), and component failure notifications. The service interfaces combined with the interfaces provided by the user-level Switch Management service encapsulate the differences between different switch vendors and provide a single uniform interface to the FabricX management system. The Switch Adapter Port Driver (SAPD) of the Kernel Services 128 uses these interfaces to learn what ports are supported by the instance so that it can create the appropriate device objects representing these ports.

Referring to FIG. 6, the SAL-CPP 127 provides Front-End Services (FRONT-END SVCS) that include creating and destroying virtual targets, activate and deactivate virtual targets. Activation causes the target to log into the network while deactivation causes it to log out. Storage Presentation objects represent the presentation of a volume on a particular target. These Front-End Services also include LUN mapping and/or masking on a per initiator and per target basis.

Referring again to FIG. 6, the SAL-CPP 127 provides Back-End Services (BACK-END. SVCS) that include discovering back-end paths and support for storage devices or elements, including creating and destroying objects representing such devices or elements. Back-End Services include managing paths to the devices and SCSI command support. These services are used by FlareX of the Layered Drivers 123 to discover the back-end devices and make them available for use, and by the Path Management of the Switch Independent Layer (SIL). The SIL is a collection of higher-level switch-oriented services including managing connectivity to storage devices. These services are implemented using the lower-level services provided by the SAL-CPP.

SAL-CPP 127 provides a volume management (Volume MGMT) service interface that supports creating and destroying virtual volumes, associating virtual volumes with back-end Storage Elements, and composing virtual volumes for the purpose of aggregation, striping, mirroring, and/or slicing. The volume management service interface also can be used for loading all or part of the translation map for a volume to a virtualizer, quiescing and resuming IO to a virtual volume, creating and destroying permission maps for a volume, and handling map cache miss faults, permission map faults, and other back-end errors. These services are used by the volume graph manager (VGM) in each SP to maintain the mapping from the virtual targets presented out the logical front of the instance to the Storage Elements on the back-end.

There are other SAL-CPP modules. The SAL copy service (COPY SVCS) functions provide the ability to copy blocks of data from one virtual volume to another. The Event Dispatcher is responsible for delivering events produced from the IMPS to the registered kernel-based services such as Path Management, VGM, Switch Manager, etc.

The Switch and Configuration Management Interface is responsible for managing the connection to an IMPS. Each Storage Processor maintains one IMPS client for each IMPS that is part of the instance. These clients are created when the Switch Manager process directs the SAL-CPP to create a session with a IMPS.

The Switch Independent Layer (SIL) 126 is a collection of higher-level switch-oriented services. These services are implemented using the lower-level services provided by the SAL-CPP. These services include: Volume Graph Manager (VGM)—The volume graph manager is responsible for processing map-miss faults, permission map faults, and back-end IO errors that it receives from the SAL-CPP. The VGM maintains volume graphs that provide the complete mapping of the data areas of front-end virtual volumes to the data areas of back-end volumes. The Volume Graph Manager provides its service via a kernel DLL running within the SP. Data Copy Session Manager—The Data Copy Session Manager provides high-level copy services to its clients. Using this service, clients can create sessions to control the copying of data from one virtual volume to another. The service allows its clients to control the amount of data copied in a transaction, the amount of time between transactions, sessions can be suspended, resumed, and aborted. This service builds on top of capabilities provided by the SAL-CPP's Data Copy Services. The Data Copy Session Manager provides its service as a kernel level DLL running within the SP. Path Management—The path management component of the SIL is a kernel-level DLL that works in conjunction with the Path Manager. Its primary responsibility is to provide the Path Manager with access to the path management capabilities of the SAL-CPP. It registers for path change events with the SAL-CPP and delivers these events to the Path Manager running in user-mode. Note, in some embodiments, the Path Management, or any of the other services may be configured to operate elsewhere, such as being part of another driver, such as FlareX. Switch Management—The switch management component of the SIL is a kernel-level DLL that works in conjunction with the Switch Manager. Its primary responsibility is to provide the Switch Manager with access to the switch management capabilities of the SAL-CPP.

The CPP also hosts a collection of Common Services 125 that are used by the layered application drivers. These services include: Persistent Storage Mechanism (PSM)—This service provides a reliable persistent data storage abstraction. It is used by the layered applications for storing their metadata. The PSM uses storage volumes provided by FlareX that are located on the Disk Array Enclosure attached to the CPP. This storage is accessible to both SPs, and provides the persistency required to perform recovery actions for failures that occur. Flare provides data-protection to these volumes using three-way mirroring. These volumes are private to a FabricX instance and are not visible to external hosts. Distributed Lock Service (DLS)—This service provides a distributed lock abstraction to clients running on the SPs. The service allows clients running on either SP to acquire and release shared locks and ensures that at most one client has ownership of a given lock at a time. Clients use this abstraction to ensure exclusive access to shared resources such as meta-data regions managed by the PSM. Message Passing Service (MPS)—This service provides two-way communication sessions, called filaments, to clients running on the SPs. The service is built on top of the CMI service and adds dynamic session creation to the capabilities provided by CMI. MPS provides communication support to kernel-mode drivers as well as user-level applications. Communication Manager Interface (CMI)—CMI provides a simple two-way message passing transport to its clients. CMI manages multiple communication paths between the SPs and masks communication failures on these. The CMI transport is built on top of the SCSI protocol which runs over 2 Gbps Fibre-Channel links that connect the SPs via the mid-plane of the storage processor enclosure. CMI clients receive a reliable and fast message passing abstraction. CMI also supports communication between SPs within different instances of FabricX. This capability will be used to support mirroring data between instances of FabricX.

The CPP includes Admin Libraries that provide the management software of FabricX with access to the functionality provided by the layered drivers such as the ability to create a mirrored volume or a snapshot. The Admin Libraries, one per managed layer, provide an interface running in user space to communicate with the managed layers. The CPP further includes Layered Drivers 123 providing functionality as described below for drivers denominated as Flare, FlareX (FLARE_X), Fusion, Clone/Mirror, PIT Copy, TDD, TCD, and SAPD.

Flare provides the low-level disk management support for FabricX. It is responsible for managing the local Disk Array Enclosure used for storing the data of the PSM, the operating system and FabricX software, and initial system configuration images, packages, and the like. It provides the RAID algorithms to store this data redundantly.

The FlareX component is responsible for discovering and managing the back-end storage that is consumed by the FabricX instance. It identifies what storage is available, the different paths to these Storage Elements, presents the Storage Elements to the management system and allows the system administrator to identify which Storage Elements belong to the instance. Additionally, FlareX may provide Path Management support to the system, rather than that service being provided by the SIL as shown. In such a case, FlareX would be responsible for establishing and managing the set of paths to the back-end devices consumed by a FabricX instance. And in such a care it would receive path related events from the Back-End Services of the SAL-CPP and responds to these events by, for example, activating new paths, reporting errors, or updating the state of a path.

The Fusion layered driver provides support for re-striping data across volumes and uses the capabilities of the IMPS have to implement striped and concatenated volumes. For striping, the Fusion layer (also known as the Aggregate layer), allows the storage administrator to identify a collection of volumes (identified by LUN) over which data for a new volume is striped. The number of volumes identified by the administrator determines the number of columns in the stripe set. Fusion then creates a new virtual volume that encapsulates the lower layer stripe set and presents a single volume to the layers above.

Fusion's support for volume concatenation works in a similar way; the administrator identifies a collection of volumes to concatenate together to form a larger volume. The new larger volume aggregates these lower layer volumes together and presents a single volume to the layers above. The Fusion layer supports the creation of many such striped and concatenated volumes.

Because of its unique location in the SAN infrastructure, FabricX, can implement a truly non-disruptive migration of the dataset by using the Data Mobility layer driver that is part of the Drivers 123. The client host can continue to access the virtual volume through its defined address, while FabricX moves the data and updates the volume mapping to point to the new location.

The Clone driver provides the ability to clone volumes by synchronizing the data in a source volume with one or more clone volumes. Once the data is consistent between the source and a clone, the clone is kept up-to-date with the changes made to the source by using mirroring capabilities provided by the IMPS's. Clone volumes are owned by the same FabricX instance as the source; their storage comes from the back-end Storage Elements that support the instance.

The Mirror driver supports a similar function to the clone driver however, mirrors are replicated between instances of FabricX. The mirror layered driver works in conjunction with the mirror driver in another instance of FabricX. This application provides the ability to replicate a source volume on a remote FabricX instance and keep the mirror volume in synch with the source.

The PIT (Point-In-Time) Copy driver, also known as Snap, provides the ability to create a snapshot of a volume. The snapshot logically preserves the contents of the source volume at the time the snapshot is taken. Snapshots are useful for supporting non-intrusive data backups, replicas for testing, checkpoints of a volume, and other similar uses.

The Target Class Driver and Target Disk Driver (TCD/TDD) layer provides SCSI Target support. In FabricX these drivers mostly handle non-read and write SCSI commands (such as INQUIRY, REPORT_LUNS, etc). The drivers are also responsible for error handling, when errors cannot be masked by the driver layers below, the TCD/TDD is responsible for creating the SCSI error response to send back to the host. The TCD/TDD Layer also implements support for the preferred CLARiiON functionality which provides the means of identifying what LUNs each initiator should see. This is known as LUN masking. The feature also provides for LUN mapping whereby the host visible LUN is translated to an instance-based LUN. Additionally such functionality when combined with a host agent provides the ability to identify which initiators belong to a host to simplify the provisioning of LUN masking and mapping.

The Switch Adapter Port Driver (SAPD) is presented as a Fibre-Channel Port Driver to the TCD/TDD (Target Class Driver/Target Disk Driver) drivers, but rather than interfacing with a physical port device on the SP, the driver interfaces with the SAL-CPP and creates a device object for each front-end port of each IMPS that is part of the FabricX instance. The SAPD registers with the SAL-CPP to receive non-IO SCSI commands that arrive. The SAL-CPP will deliver all non-IO SCSI commands received for LUs owned by this driver's SP to this SAPD. The SAPD runs as a kernel-mode driver.

The following services are user based: Governor and Switch Management. The Governor is an NT Service that is responsible for starting other user-level processes and monitoring their health and restarting them upon failure. The Switch Manager controls sessions created in the SAL-CPP for each IMPS. The Switch Manager is responsible for establishing the connections to the switches under its control and for monitoring and reacting to changes in their health. Each SP hosts a single Switch Manager that runs as a User-level process and a Kernel-mode service within the SP.

Reference is made once again to FIG. 6. The Raid++ services encapsulates the legacy logic dealing with the configuration and management of the array logical components (such as storage group, LUNs, etc.) and physical components (such as cabinets, DAEs, disk drives, etc.). The Providers are plug-in modules to the CIMOM which provide the functionality for a particular set of managed objects. Providers represent the objects (class definitions and behaviors) as defined in the object model of the managed element. The Admin Libraries include an interface between the user space management tasks and the kernel mode drivers' instrumenting the management of FabricX. The Admin Libraries accept requests using a Tagged Length Data (TLD) self-describing message format from the management layer and converts those requests into the specific IOCTL calls required to realize those requests. Responses are returned using the same format.

The Path Management is responsible for the construction and management of paths to back-end Storage Elements and is part of Kernel-mode services. It notes when paths change state; based on these state changes it applies its path management policies to take any adjusting actions. For example, upon receiving a path failure notification, the Path Management might activate a new path to continue the level of service provided for a back-end volume.

One function of FabricX Volume Management is to combine elements of the physical storage assets of the FabricX Instance into logical devices. The initial implementation of the FabricX Volume Manager is based on the Flare Fusion Driver. As in Flare, the basic building blocks of the volumes exported by FabricX are constructed from the back-end storage devices. Each device visible to the FabricX instance will be initially represented as an un-imported Storage Element. The storage administrator will able to bind the individual storage elements into single disk RAID Groups. From these RAID Groups the administrator can define Flare Logical Units (FLU). In the FabricX environment the FLUs will be exported by the FlareX component to the layered drivers above.

Flare Fusion imports FLUs and aggregates them into Aggregate Logical Units (ALU). When a logical unit or SCSI Disk is presented to a client host it is called a Host Logical Unit (HLU). HLUs can be created by: directly exporting a FLU; exporting an ALU created by concatenating two or more FLUs; and exporting an ALU created by striping two or more FLUs.

The FabricX Inter Process Communication Transport (FIT) provides the message passing support necessary for the SAL Agents running on the IMPS's to communicate with the SAL-CPP client instance running on each SP. This transport provides a model of asynchronous communication to its clients and is responsible for monitoring and reporting on the health of the communications network connecting the IMPSs to the CPPs. FIT uses a proprietary protocol developed on top of the SCSI/FC protocol stack to provide a control path between the SPs and the IMPS's. This protocol runs over the Fibre Channel connecting the SP to the IMPS's switch. FIT supports multiple transport protocols. In addition to SCSI/FC FIT also supports TCP/IP.

FIG. 7 shows the software components of the intelligent switch or IMPS 22 or 24. IMPS Software Components include an IMPS API and FIT 132, SAL Agent 130, and IMPS Operating System 134. Each switch vendor provides a software interface to the services provided by their switch that is the IMPS API and the SP's communicate with this API. This API provides support to application software that runs within the switch or blade and in some cases this interface is remote to the switch. FabricX isolates the storage application logic from these differences by defining the Switch Abstraction Layer (SAL-CPP) discussed with reference to FIG. 6. The SAL Agent 130 is an application from the perspective of the IMPS and works with SAL-CPP 127 (FIG. 6) and the FIT of the SAL-CPP and of the IMPS. The Agent 130 directly uses the native IMPS API to control and communicate with the switch. Its function is to provide access to the services of the switch to the Control Path Processors. The IMPS operating system varies from switch vendor to vendor. For example, Cisco's Intelligent Switches use Monte Vista Linux, while the Brocade switches use NetBSD.

FabricX preferably uses the Flare architecture from CLARiiON. This architecture uses a Windows driver stack. At the lowest layer is the code, labeled FlareX (Flare_X) that interfaces to the back-end devices. The storage applications are logically layered above FlareX as Windows device drivers, including Fusion, Mirror_View, Snap_View, Clone_View, and TCD/TDD. These layers provide support for features such as volume concatenation, striping, clones, snapshots, mirrors, and data migration. These layers also define virtualized Logical Unit objects.

This architecture includes replication layers: Snap_View, Clone_View, and Mirror_View are layered above the Fusion layer of code and consume the logical units (volumes) presented by the Fusion layer, they likewise present logical units to the layers above. The replication layers have no knowledge of back-end devices or data placement thereon.

The inventors have critically recognized that prior art storage arrays had limited processes to create clones, which are replicas stored within an array, and mirrors, which are replicas stored on different arrays. This is because the front end of an array has no way to directly access to a back end device in some other array. Remote mirroring in such prior art configurations is processed through two different arrays, one attached to a host and one attached to remote back end devices. These two arrays are then connected to each other via a WAN. However, the present invention being based on a switch and storage architecture does not have such limitations. Instead, all back end devices are equivalent irregardless of their physical location though latency of access may vary. A back end device may be connected to a back-end port of a switch through some WAN making it physically remote. With a switch-based architecture clones, which are replicas stored within the storage managed by the instance, can be created from storage that is physically remote from the Controller and switch hardware just as easily as creating it from storage which is physically close to this hardware. Only one FabricX instance is necessary, to create clones whether on physically local back-end devices or on physically remote back-end devices. However, if it is desirable to create replicas, mirrors, between instances of FabricX that is possible. For example, one might want to create a replica on another instance for the purpose of increasing data protection and providing a means to tolerate a failure of a FabricX instance, or to replicate data using an asynchronous protocol for very long distance replication.

Further Operation Details

Figure 8:
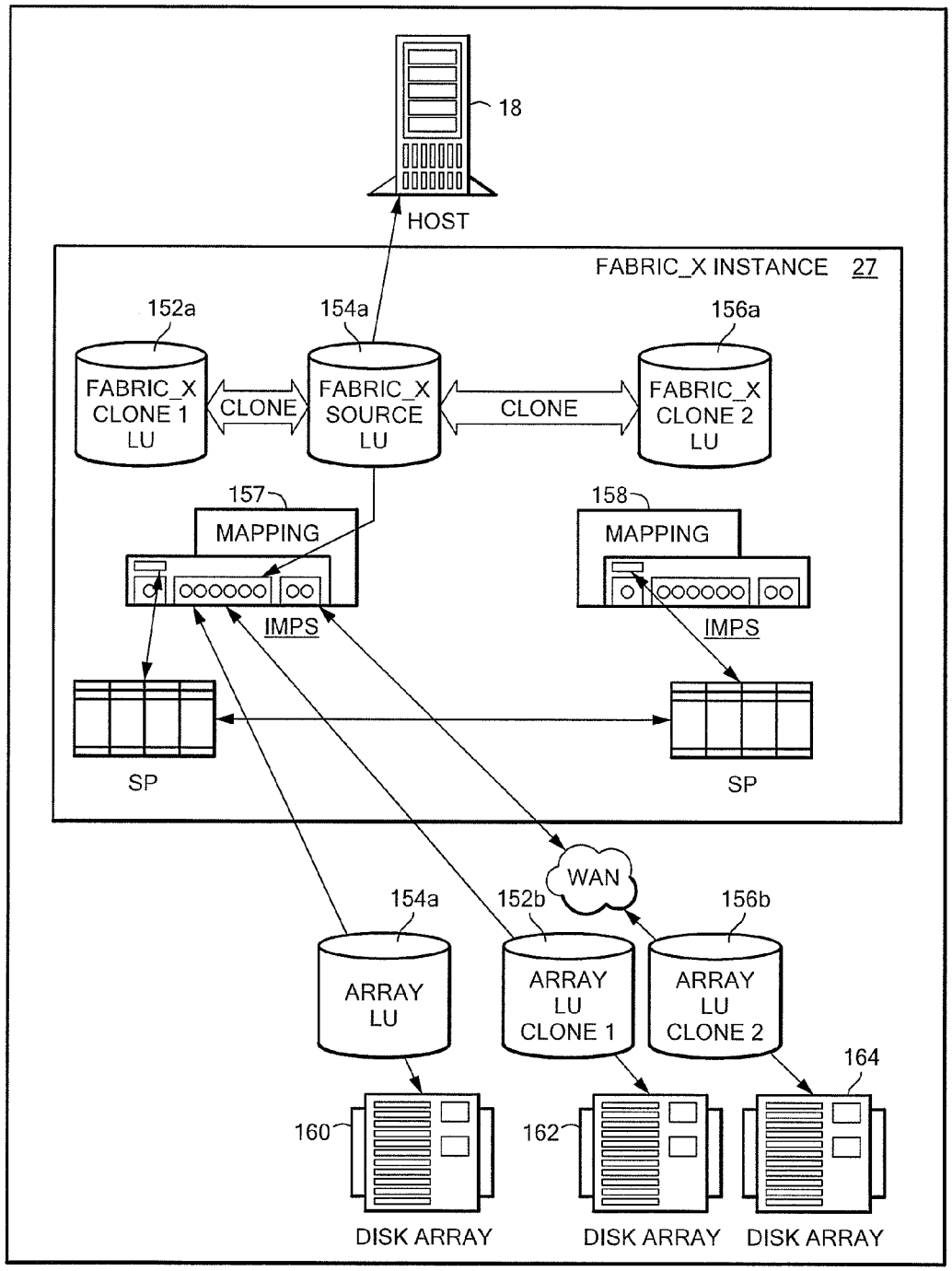
FIG. 8 shows an example of implementation of clones in the environment of FIG. 1.

FIG. 8 shows an example of creation and use of clones with a FabricX instance. In this example, a Source Logical Unit (LU) 154a is connected to a host 18 together with two clones, Clone 1 152a and Clone 2 156a on FabricX Instance 27. The connection of the host is shown directly, but it may also be indirect and/or via a SAN. Clone 1 is made on a back end device provided by a locally attached array. Clone 2 is made on a remote device provided by an array located at some distance and connected to the local FabricX Instance 27 which can be accomplished by means such as Asynchronous Transfer Mode (ATM) or Dense Wave Division Multiplexing (DWDM) networks. Because these replicas are logically equivalent both are referred to as Clones. Clones made using one FabricX Instance can be accessed by hosts connected to the same FabricX Instance mapped in respective mapping areas 157 and 158 of each IMPS controlled by a respective SP. Using the mapping 157 the respective FabricX instance presents the Source LU 154a to the Host 19, while maintaining the cloned replicas 152b and, via a WAN, the replica 156b related to respective arrays 160 164.

Figure 10:
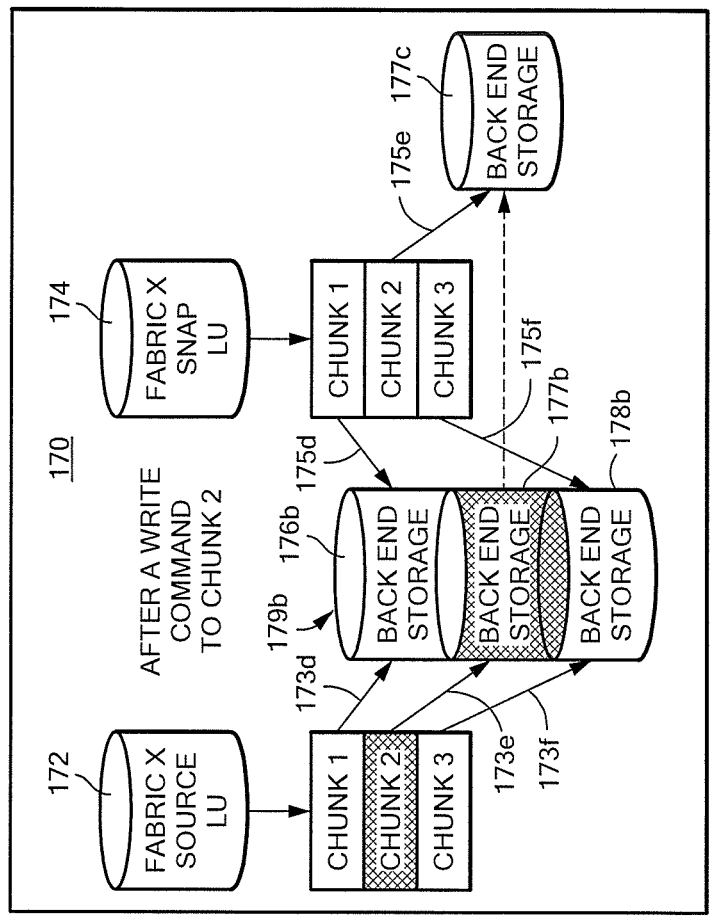
FIG. 10 shows another example of SNAP Processing at another time in the environment of FIG. 1.
Figure 9:
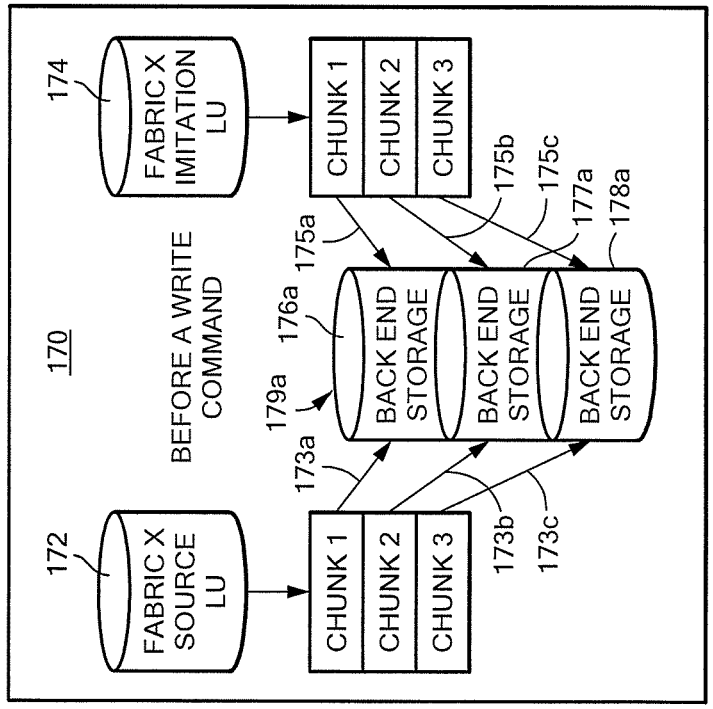
FIG. 9 shows an example of SNAP Processing at a time in the environment of FIG. 1.

FIGS. 9 and 10 show an example of Snap replicas created using FabricX. Snaps are constructed by using a process called Copy On First Write (COFW). When a Snap is created it represents the state and contents of a volume as it existed at the time of creation. With the COFW technique a snap is initially just a map of pointers 173a c and 175a c. These map pointers initially refer to the blocks 176a 178a in the Source, a.k.a. Ancestor, volume 179a. Only when a block in the source volume is about to change is it necessary to actually create a copy of the data as it was when the Snap was instantiated. When a write is received for a chunk of data the sub-segment(s) that refer to the chunk are copied from the Source to another area on a back-end volume (BEV) that is assigned to the Snap.

FIG. 10 shows a volume consisting of three chunks of data after the Snap is created and before any write commands are received. Both the source and Snap maps point to the same three chunks of data on back end storage, i.e., pointers 173d f and 175d f point to respective blocks 176b 178b on volume 179b. When a write is received, say for chunk 2, FabricX will block the write command. It will copy chunk 2 from the back end storage to some newly allocated space on back end storage and change the Snap's map to point to this new location. FabricX will then allow the write of chunk 2 to proceed to the old location. After the write is complete the mapping is as shown in FIG. 10.

Figure 11:
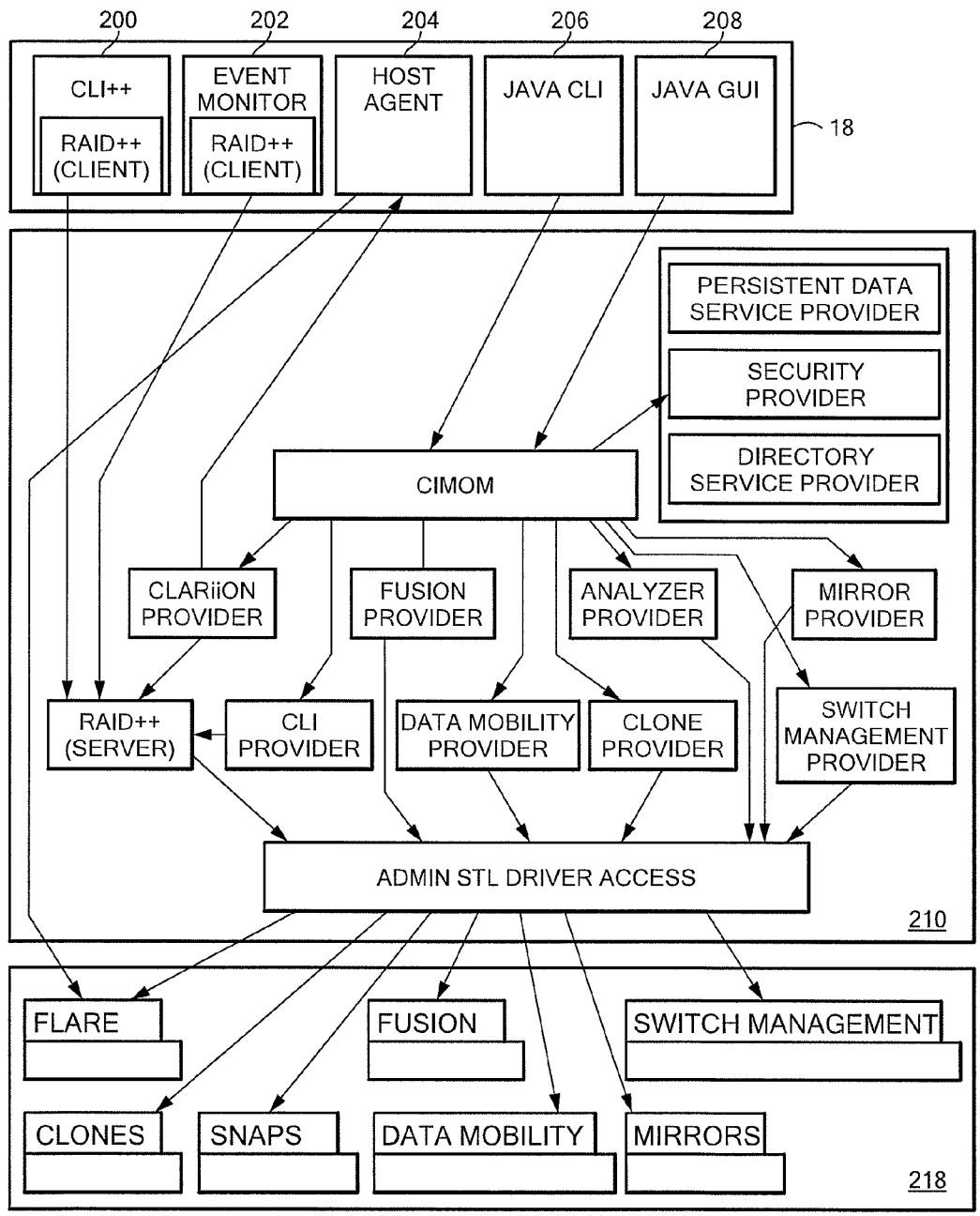
FIG. 11 shows a schematic block diagram of software components of the architecture of FIG. 1 showing location and relationships of such components to each other.
Figure 16:
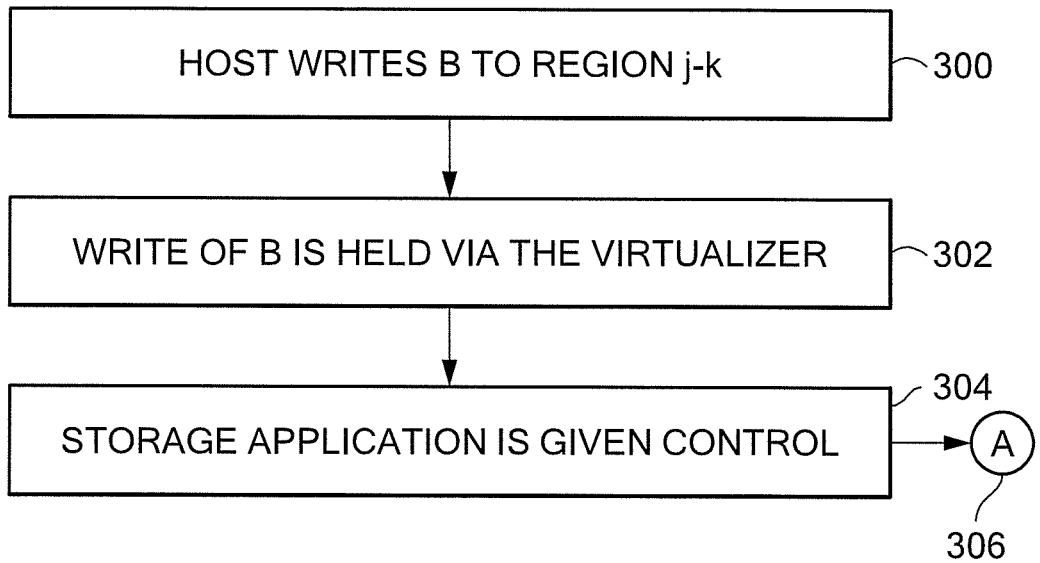
FIG. 16 is a flow logic diagram illustrating a method of managing the resources involved in the SNAP Processing shown in FIGS. 14 15.

FIG. 11 shows a schematic block diagram of software components of the architecture of FIG. 1 showing location and relationships of such components to each other. The components reside within either the client (host) computers or the CPP of FabricX and use various communications method and protocols. The following describe the function of each of the major components and their interfaces to associated functions.

Several components of FabricX System Management reside on Host computers (those using the storage services of FabricX and/or those managing FabricX), these are referred to as Client Components and are shown in group 18. One component in particular, Raid++, has both a client and server instance, shown respectively in host/client group 18 or server group 210. The C++ Command Line Interface CLI 200— referred to here as CLI++) component resides on any system where the user wishes to manage FabricX using a text based command line interface. This component in conjunction with the Java based CLI provide the user with control over FabricX. The security model for the CLI++ is host based; the user/IP address of the host is entered into the FabricX registry to permit/limit the user's access to system management. The CLI++ uses a client instance of Raid++ to hold the model of the FabricX instance and to manipulate the configuration of FabricX. The client resident Raid++ communicates with the server based Raid++ using a messaging scheme over TCP/IP.

The Java CLI 206 provides commands that use a different management scheme from that used by the CLI++. The Java CLI captures the user command string, packages it into an XML/HTTP message and forwards it to the CIMOM on the server group 210. The CIMOM directs the command to the CLI Provider which decomposes the command and calls methods in the various CIM providers, primarily the CLARiiON provider, to effect the change.

The Java GUI 208 provides a windows based management interface. It communicates with CIMOM using standard CIM XML/HTTP protocol. The GUI effects its changes and listens for events using standard CIM XML/HTTP. The Host Agent 204 provides optional functionality by pushing down to FabricX information about the host. The following information is forwarded by the Agent explicitly to the CPP: Initiator type, Initiator options, Host device name used for push, Hostname, Host IP address, Driver name, Host Bus Adapter (HBA) model, HBA vendor string, and Host ID.

The Event Monitor 202 resides on a host and can be configured to send email, page, SNMP traps, and/or use a preferred EMC Call Home feature for service and support. The configuration is performed on the CPP and the configuration information is pushed back to the Event Monitor. The Event Monitor may also run directly on the CPP but due to memory constraints may be limited in function in comparison to running on a host computer.

Referring again to FIG. 11, the server side management components shown in group 210 interact with the user interfaces and tools for administering the system configuration and operation and to report on system operation. The server side components are comprised of middleware which resides between the user and the storage management components of the system which implement FabricX storage features. The server side components are basically divided into two groups, the legacy Raid++ module which provides the majority of the management services and the CIMOM and its providers. The Raid++ module uses a proprietary transport to communicate with management clients such as the CLI++. The Raid++ module maintains an object model of the system that it uses for managing the system; it updates the model periodically and on demand by polling the system to rebuild the model. The CIMOM CLARiiON Provider is essentially a wrapper for the Raid++ classes and methods and translates GUI initiated CIM XML commands into calls to Raid++ to fulfill requests.

The management functions not provided by Raid++ are provided by a series of CIMOM providers which are attached to a CIMOM. The CIMOM provides common infrastructure services such as XML coding/decoding and HTTP message transport. The hosted services exclusively implemented in CIMOM providers are: Analyzer Provider—Provides statistics about performance of traffic on ports on the switch; CLI Provider—This provider implements services to allow CLI clients to access CIM managed services such as Clone, Analyzer, Fusion, and switch management; Clone Provider—Provides services to manage the configuration and operation of clones; Data Mobility Provider—Provides services to manage the configuration and operation of data migration between storage volumes transparently to the host applications using the storage; Fusion Provider—Provides services to configure and manage the combining of LUNs to create new LUNs of larger capacity; Mirror Provider—Provides services to manage the configuration and operation of mirrors; and. Switch Management Provider—Provides services to configure and manage the attached intelligent switch components owned by FabricX.

The above-described providers periodically poll the system infrastructure to build a model of the existing component configuration and status. If any changes are detected in configuration or status between the existing model and the newly-built model, registered observers are notified of the changes. The model is then updated with the new model and saved for queries by the provider. The services of these providers can be accessed from other providers by formulating XML requests and sending them to the CIMOM. This permits providers which require the services of other providers (such as Raid++ through the CLARiiON Provider or the CIM local services such as persistent storage, directory services, or security) to access those services. Additionally Admin STL Driver Access through the server side provides access to these providers to the drivers and services of an SP as shown in group 218, including to the following drivers: Flare, Clones, Snaps, Fusion, and mirrors and services for switch management and data mobility.

Other Service Providers are shown in group 212 of the server group 210, and include the Persistent Data Service Provider, Security Provider, and Directory Service Provider. The Persistent Data Service Provider provides the CIMOM with access to the kernel-based PSM. The CIMOM uses the PSM to store meta-data relevant to the management system for example user names and passwords. The Security Provider supports authentication of users and authorization of user roles. The Directory Service Provider is used to obtain the network addresses of the systems in a domain of managed FabricX instances.

Reference will be made below to FIGS. 12-20 to describe a problem solved with the architecture including the software components described above with reference to FIGS. 1 11; however a general overview is now given. The inventors have critically recognized that Intelligent Multi-Protocol Switches (IMPS) 22 or 24 generally have limited memory resources available to support mapping virtual storage extents to physical storage extents. A typical switch today is capable of storing 10,000 maps per translation unit. Certain storage applications, such as a volume snapshot application can consume large numbers of these maps in support of a single volume. This further reduces the set of volumes that a translation unit can support.

This problem is addressed with the architecture of the present invention by using memory with the FabricX Storage Processor 26 or 28 to supplement the memory resources of the IMPS's translation unit and more efficiently use memory of each. The translation unit's memory resources are used to store a subset of the full set of extent maps for the volumes exported by the translation unit. Maps are loaded to the translation unit from the CPP both on demand and ahead of demand in a technique denoted as being a virtualizer application which is preferably software running in a SP or on the IMPS. In this embodiment, sequential access is detected and future requests are predicted using protection maps to mark the edges of unmapped regions. Access to a marked region in combination with the detection of sequential access triggers the preloading of additional maps prior to the arrival of the actual request.

I/O requests that arrive to find no mapped region are handled by loading the map from the control-processor. The control processor uses access data collected from the intelligent multi-protocol switch to determine which data to replace. Supported cache replacement algorithms include least-recently used, least frequently used. The IMPS hardware is used to detect need for extents prior to access and statistical data is collected on volume access to select which cache entries to replace. The mechanism further identifies volumes whose extent maps have become fragmented and triggers a process to reduce this fragmentation.

Referring to FIG. 12, Virtualization Mapping from a logical volume 230 to physical storage 232, 234, and 236 is shown. A Host 18 write to the volume in the region 0-K is mapped to physical block segment 232 (SE1), and likewise to the volume in the region 0-(j k) to physical block segment 234 (SE2), and also to the volume in the region 0-(n k) to physical block segment 236. In this simple example of Virtualization Mapping the Logical Volume 240a maps byte for byte with the storage element 242a. To be precise region 0 through k−1 of 230 is mapped to SE1 (232). Likewise region k through j−1 or 230 is mapped to SE2 (234) and region j through n−1 is mapped to SE3 (236).

Referring to FIG. 13 and FIG. 14, such virtualization mapping is shown using the embodiment described above with reference to FIGS. 1 11, wherein FIG. 13 shows an example case of before a Snapshot or Snap, and FIG. 14 shows after a Snap where no writes have taken place. A source logical volume 240a (FIG. 13) is mapped to segment block 242a containing data "A" in the region 0-n. At the point when the Snap is created, the Snap Cache is merely associated with this Snap volume—the Snap volume does not actually map portions of its storage to the Snap Cache until a write takes place.

Figure 17:
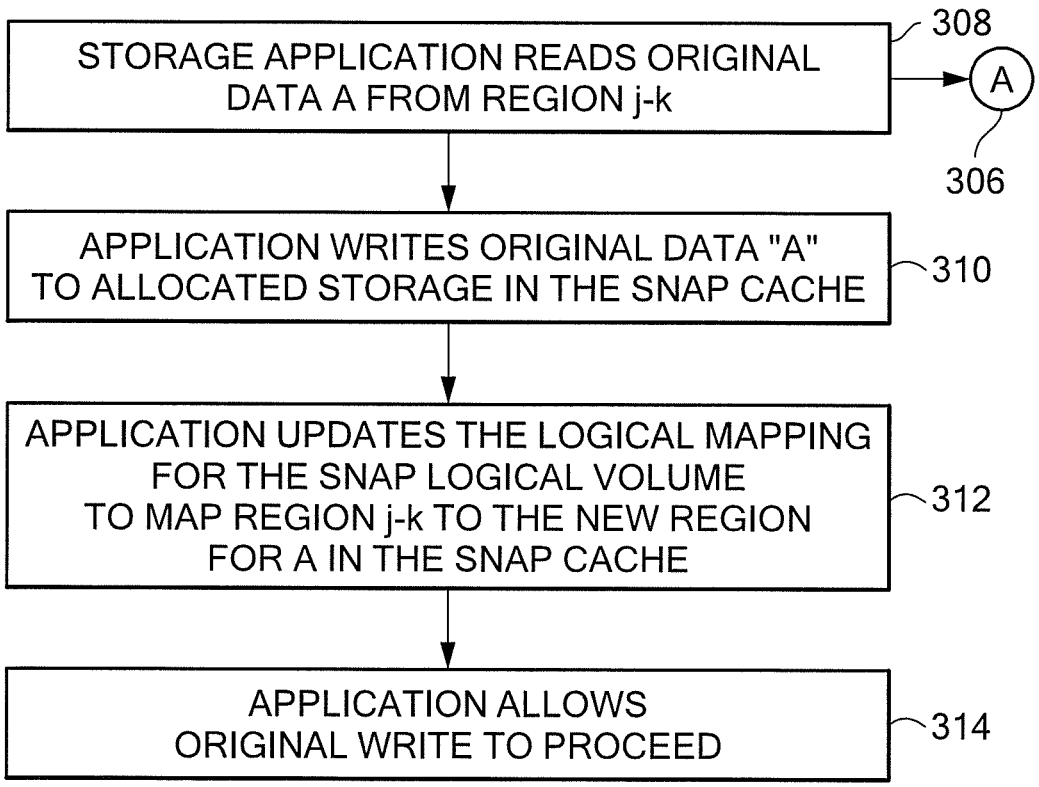
FIG. 17 is another flow logic diagram illustrating a method of managing the resources involved in the SNAP Processing shown in FIGS. 14 15.

An example of solving the problem described in general is shown with reference to FIG. 15, which depicts the example of a virtualization mapping case wherein a write takes place after the Snap. This example case is described in reference to method steps shown in Flow diagrams depicted in FIGS. 16 and 17. In step 300, the host 18 writes data B to region j-k of logical volume 242b (FIG. 17). In step 302 the write of data B is held by the storage application. The application carrying out the methodology is given control is step 304 which flows into the "A" connecting step 306, which flows into its identically identified counterpart for FIG. 17.

Referring to FIG. 17, in steps 308 and 310, the application reads the original data A from region j-k of segment 242b and writes the data to the allocated storage in the snap cache 246b. In step 312, the application updates the logical mapping for the snap logical volume 244b to map region j-k to the new region for A in the snap cache 246b. Then in step 314 the application allows the original write to proceed.

Figure 18:
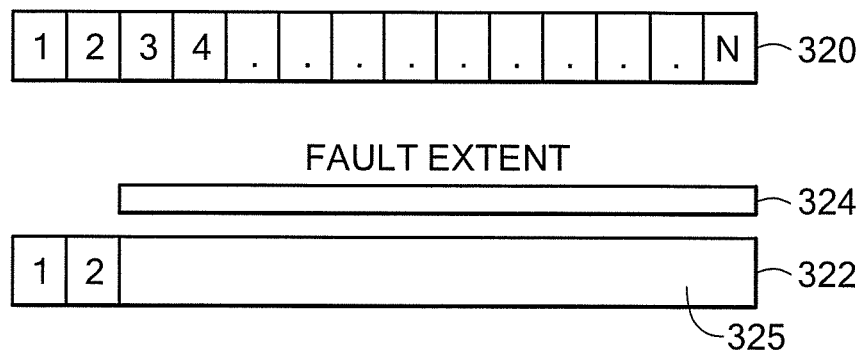
FIG. 18 is an example of a data structure involved in a process of identifying and handling volumes that have extent maps that have become fragmented during SNAP Processing and a process to reduce such fragmentation.
Figure 19:
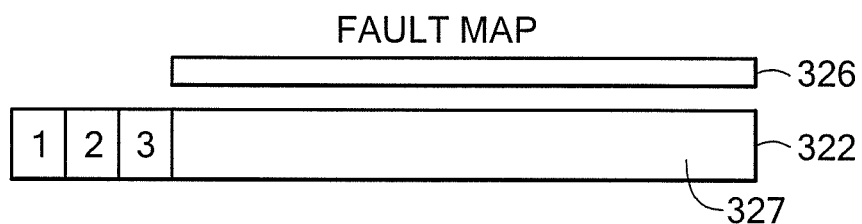
FIG. 19 is another example of a data structure involved in a process of identifying and handling volumes that have extent maps that have become fragmented during SNAP Processing and a process to reduce such fragmentation.
Figure 20:
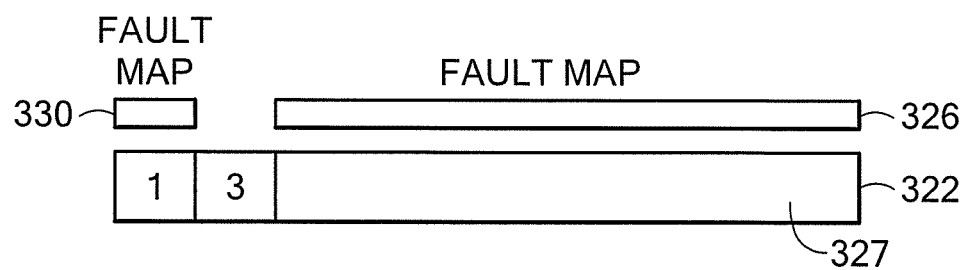
FIG. 20 is another example of a data structure involved in a process of identifying and handling volumes that have extent maps that have become fragmented during SNAP Processing and a process to reduce such fragmentation.

FIGS. 18-20 show fault extent mapping that is a further feature of the storage application. In this embodiment volumes whose extent maps have become fragmented are identified and a process to reduce this fragmentation is invoked. Referring to FIG. 18, volume 320 has been fragmented into N segments and volume 325 in conjunction with 324 represents a mechanism for preserving the image of 320. I/O operations to the region covered by 324 cause a fault which yields control of the I/O to the storage application. This simplified diagram illustrates a fault region that applies to both reads and writes however the switches and the SAL Agent and the IMPS API also support the ability to create fault-regions that apply only to reads or only to writes. In the example case, the CPP running the storage application takes the fault and updates the extent map for the volume to map region 3 and a fault map 326 is created for the region 327. (FIG. 19). To reduce fragmentation a new fault map 330 is created and the map entries 1 and 2 are combined (FIG. 20). This causes a reduction in the number of entries required to support the volume.

Figure 26:
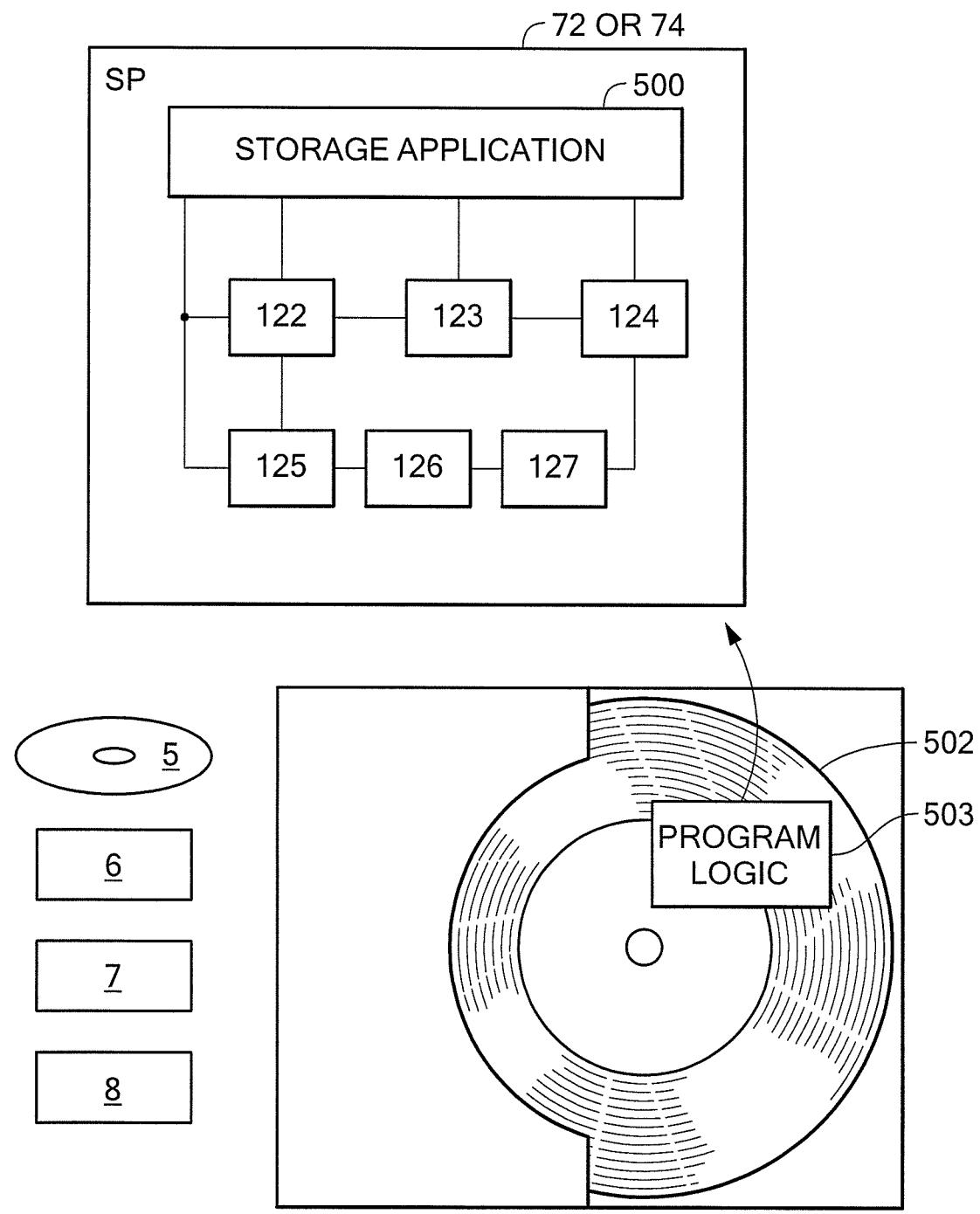
FIG. 26 shows a software application for carrying out the methodology described herein and a computer medium including software described herein.

FIG. 26 shows the storage software application 500 in an SP 72 or 74 and also including the software components 122 27 of FIG. 7. Computer-readable medium 502 includes program logic 503 that may include any or all of the software 122 127, and 500. Such a medium may be represented by any or all of those described at the beginning of this Detailed Description.

FIGS. 21-25 describe an embodiment for ensuring consistent error presentation to hosts accessing virtualized volumes and for preserving structured error handling, and a general overview is now given. In general, it is recognized by the inventors that without this invention virtualizing intelligent switches process I/O requests from host computers at wire speed and do not present these requests to storage applications. Errors that occur while processing these requests may present an inconsistent error behavior to the hosts accessing the volume due to this errors originating from disparate back-end storage devices. Furthermore certain errors would be better handled and masked according to the structure and semantics of a virtual volume.

In this embodiment the storage application (FIG. 26) is given control of a request when exceptional conditions occur such as an error when processing the request. This invention provides a means of handling errors in a hierarchical manner allowing storage applications to be structured in a manner consistent with the structure of a virtual volume. Errors are presented to the applications using a bottom-up delivery algorithm that allows lower-level applications to mask errors from higher layers. Applications are given the initial context of the I/O request along with the error allowing them to only incur additional overhead when exceptional conditions arise. The storage applications process and transform errors from disparate back-end devices and unify the presentation of these errors to make the volume appear as a single device to the hosts that access it.

Figure 21:
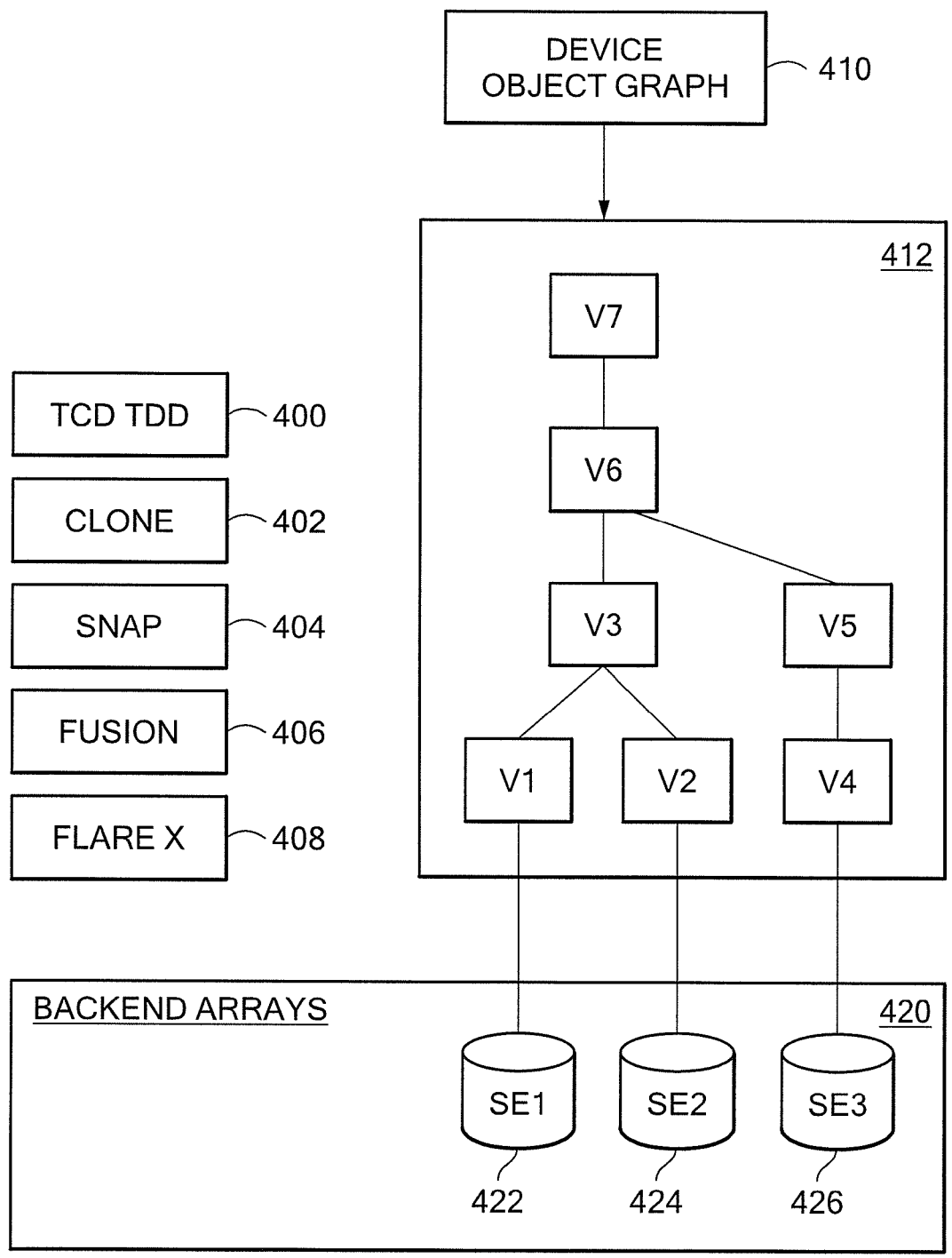
FIG. 21 is a schematic showing a hierarchical structure employed in the Data Storage Environment of FIG. 1 within the storage processor of FIG. 3 for allowing storage applications to be managed for consistent error presentation or handling.

Referring to FIG. 21, a schematic block diagram of elements of the architecture shown in the above-described Figures is presented to show the relationship of the layered drivers with the Device Object Graph 410 and its logical volumes in group 412, and the relationship to Backend arrays 420 including physical volumes 422 426 to which the logical volumes are mapped. The layered drivers TCD/TDD 400, Clone 402, Snap 404, Fusion 406 and FlareX 408 are part of layered drivers 123 discussed above with reference to FIG. 6. Generally each driver presents volumes to the layer above it. For example the FlareX driver imports storage extents from the backend array and presents the identity of such extents to layered drivers above, e.g. Fusion, and Clone drivers.

Regarding nomenclature used for presenting an example of how this embodiment functions, in the volume group 412, V7 represents a "top level" volume, or one that is capable of being presented to a host. V6 represents a cloning volume. This volume has two children, V3 and V5, where V3 is the source for the clone and V5 is its replica. Similarly V1 and V2 are children of V3 while V4 is a child of V5. It is the children at the bottommost layer that are presented by the bottommost driver in this example (FlareX) to map the storage extents of the backend array that are of interest.

Figure 22:
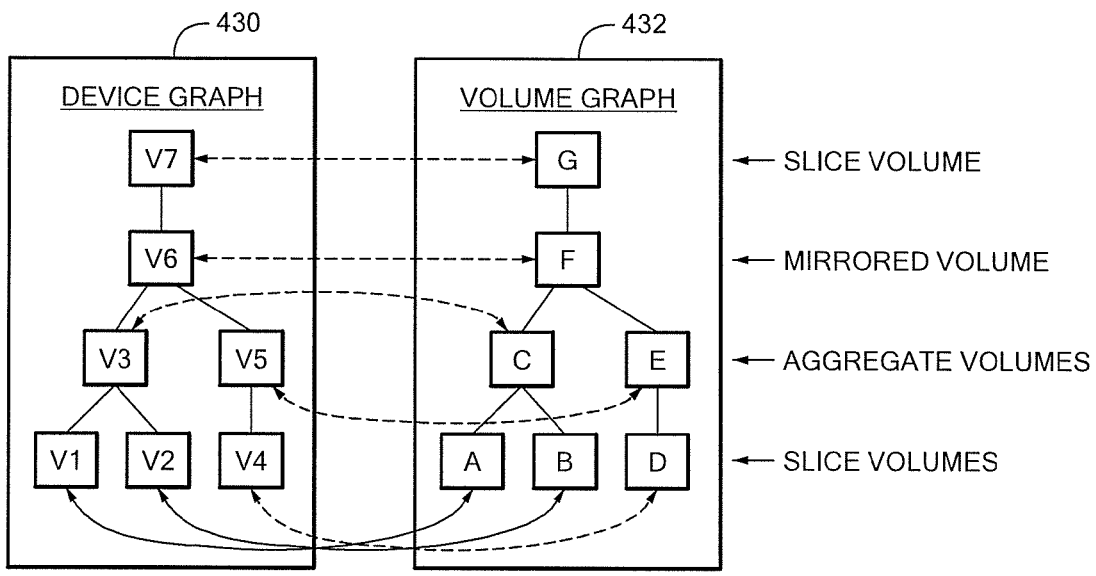
FIG. 22 is a schematic of associations present when handling errors for consistent error presentation or handling with the hierarchical structure of FIG. 21.

Referring now to FIG. 22, a Device Graph 430 and a Volume Graph 432 illustrate the relationship between drivers and volumes. The Volume Graph is a data structure that is the same as a known Device Graph in known Clariion architecture. The Volume Graph maps to the Device Graph in order to present information needed for virtualization by the IMPS, and provides a mechanism by which errors can be received and handled by the Device Drivers. In an effort to have the host seamlessly communicate with software components discussed herein in the same way it would if communicating with a data storage system such as an EMC Symmetrix or Clariion. Virtualization Software in the SP accomplishes this goal and also by communicating with software in the IMPS to present information about the volumes consistently, including presentation and management of errors. The Volume Graph provides a mechanism by which an error can be introduced into the Device Graph and presented to the host.

Information extracted from the IMPS through its API includes the type of I/O operation (e.g., read or write), a logical volume target or in this context a virtual target (VT), a virtual LUN (v-LUN), physical target, a physical LUN, block address of a physical device, length of request, and error condition. The error condition is received and that identifies the bottommost affected volume and delivered to the bottommost affected object.

Objects in the Volume Graph have one-to-one congruity with objects in the Device Graph, as follows. At the top layer (V7) the Volume Graph Object G represents a slice volume. A slice volume represents a "slice" or partition of its child volume. It has only one child volume and presents a (possibly complete) contiguous subset of the data of this child volume. The next layer down (V6) is congruently mapped to element F represents the mirrored volume. V3 represents an aggregated volume consisting of the concatenation of volumes V1 and V2. Volume V5 is a slice volume that presents the data of V4. Slice Volume Objects A, B, and D, are congruent with Device Graph Objects V1, V2, and V4, respectively.

Upon receiving an error, the Bottommost Volume Graph Object will deliver the error to its corresponding Device Graph Object. The Device Graph Object as the owner of the error can decide how to handle, e.g. propagate the error up the layer stack, or deal with it directly and not propagate it. Two goals are carried out in the error presentation: consistent presentation to the host, and masking of errors which involves using independent capabilities of the FabricX architecture to solve problems for the host at the unique middle-layer level of a FabricX instance.

Figure 23:
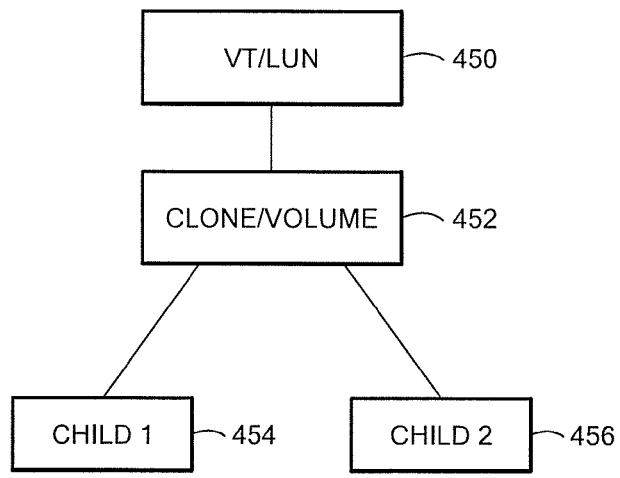
FIG. 23 is an example of a structure implementing error handling for consistent error presentation or handling, and which is a simplified version of the type of structure shown in FIG. 21.
Figure 24:
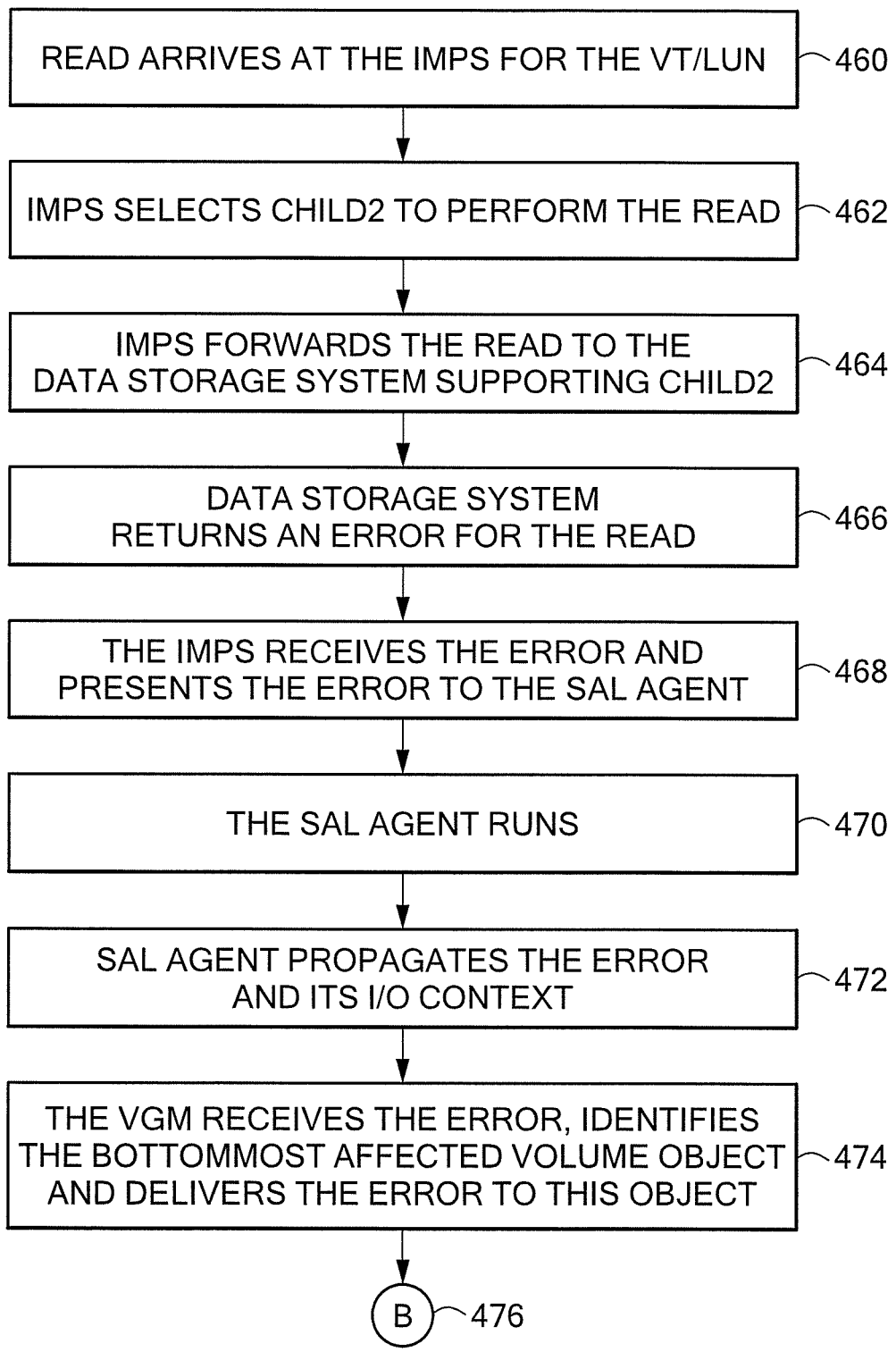
FIG. 24 show method steps for consistent error presentation or handling and using the example structure of FIG. 23.
Figure 25:
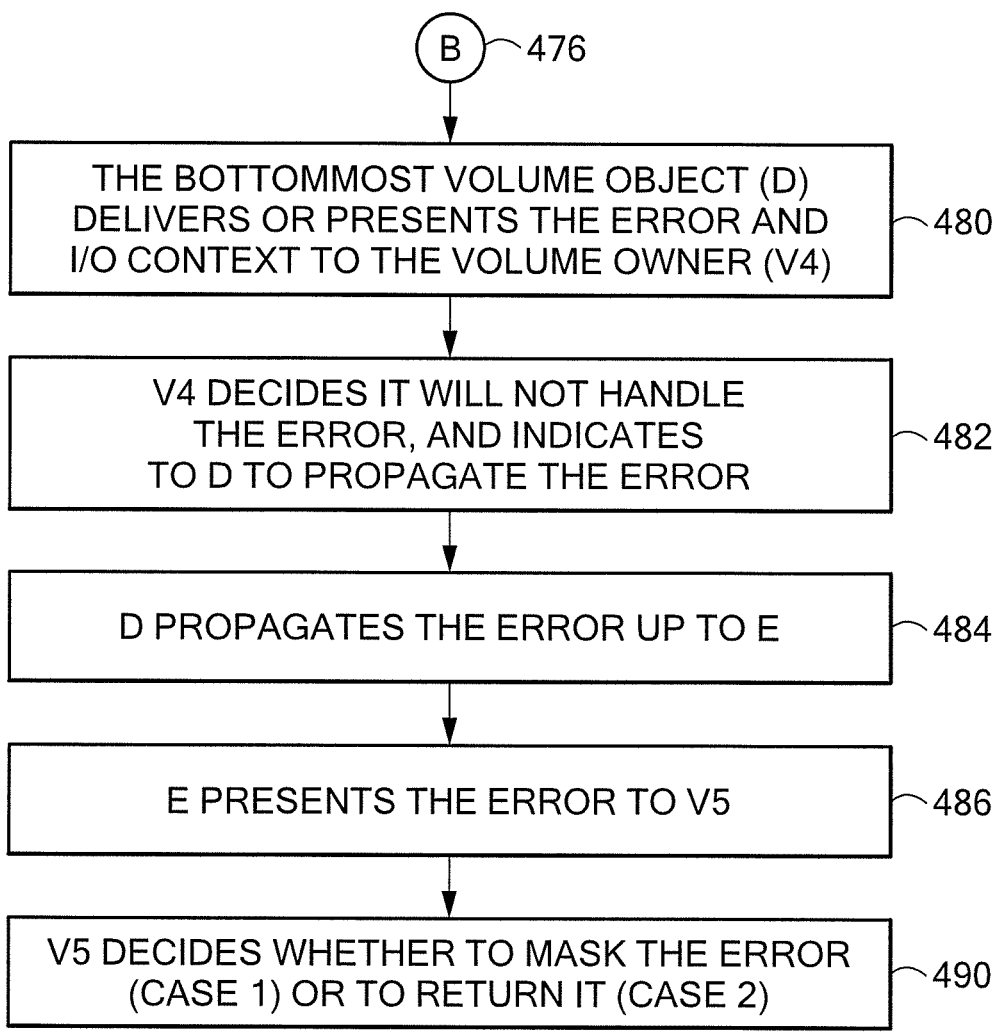
FIG. 25 show additional method steps for consistent error presentation or handling and using the example structure of FIG. 23.

Reference is made below to FIGS. 23-25, wherein an example of handling of an error for either consistent presentation to the host or masking of the error while handling the error at the FabricX instance or middle switch level is shown. In the example shown in FIG. 24, Virtual Target (VT) LUN or VT/LUN 450 is loaded with a Volume presentation of a Clone or Clone/Volume 452 and having two Children Volumes, i.e. "Child1" 454 and "Child2" 456. In this example case, Child1 and Child2 are synchronized, Child1 represents storage for one type of Data Storage System, for example an EMC Symmetrix, and Child2 represents storage for another type of Data Storage System, for example an EMC Clariion.

In handling the error in this example, there are two cases for handling in keeping with the goals discussed above: (a) Case 1—error is not delivered back to host but rather handled by a Device Object at the FabricX instance level; or (b) Case 2—error is transformed to have the error personality of FabricX. Each method of handling is explained in the example, continued with the flow-diagrams of FIGS. 24 and 25.

Referring to FIG. 24, in step 460, an I/O command in the form of a read arrives at an IMPS for the VT/LUN. In step 462, the IMPS selects Child2 to perform the read. The IMPS forwards the read to the data storage system supporting Child2 in step 464. That data storage system returns an error for the read in step 466. In step 468, the IMPS receives the error and presents the error to the SAL Agent in the IMPS in the preferred embodiment, but one skilled in the art will recognize that it could run elsewhere, including in an SP. In steps 468 and 470, the error is propagated from the SAL Agent running on the IMPS to the SAL CPP running on the SP. The SAL CPP then delivers the error to the Volume Graph Manager. The Volume Graph Manager VGM identifies the bottommost affected volume object and delivers the error to this object in step 474. Connecting step 476 labeled "B" connects with the identically numbered and labeled step on FIG. 25.

Referring to FIG. 25, in step 480, the bottommost object (D) delivers or presents the error and its I/O context to the Volume Graph Object Owner (V4). V4 decides it will not handle the error and indicates to D to propagate the error, which D does up to E, shown in steps 482 and 484. E presents the error to V5 in step 486. In step 490 V5 decides whether to mask the error (Case 1) and handle it itself at the FabricX level, or to return it to the Host (Case 2). If Case 2 is selected, then the error is transformed to have the error personality of FabricX. In this example, that means that V7 updates the error presented by the storage system and using the SAL Agent to modify the error on the switch via the IMPS API. This in turn causes the error to be returned to the host with modified content, but from the switch or FabricX level.

Figure 27:
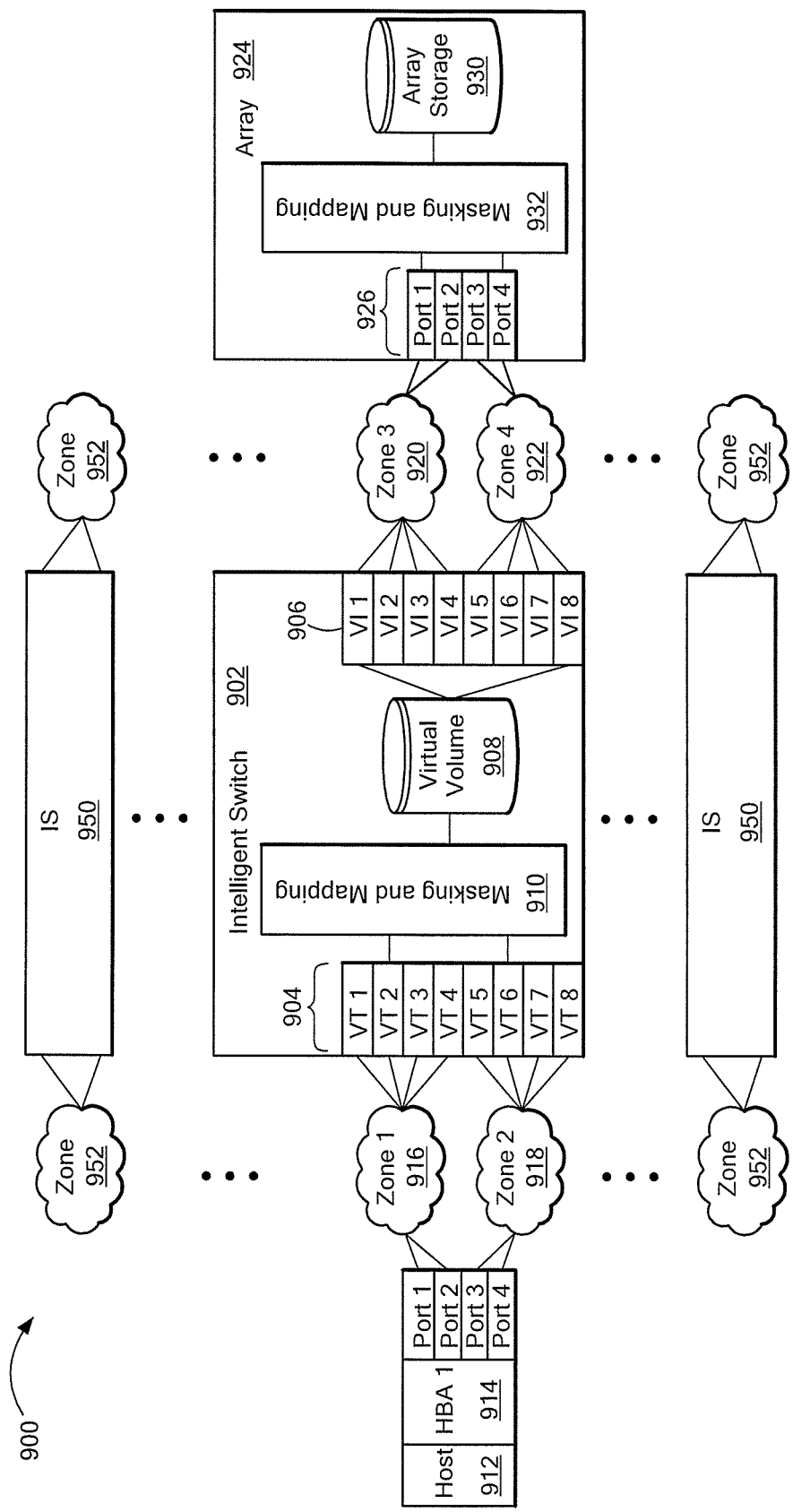
FIG. 27 is a schematic depiction of storage virtualization

FIG. 27 shows an exemplary illustration of the connectivity from a host HBA port to the storage on an array through the intelligent switch via the VTs and VIs. FIG. 5 shows an exemplary system including hardware components and FIG. 27 shows an exemplary system with virtualization including exemplary virtual targets and virtual initiators.

The system 900 includes an intelligent switch 902 having a series of virtual targets 904 (shown as VT 1 to VT 8) and virtual initiators 906 (shown as VI 1 to VI 8) provided by a virtual volume 908 and a masking and mapping module 910. A host 912, having a first host bus adaptor HBA1 includes a series of ports 914 coupled to first and second zones 916, 918. In the illustrated embodiment, the first and second ports (Port 1 and Port 2) are coupled to the first zone 916 and the third and fourth ports (Port 3 and Port 4) are coupled to the second zone 918. It is understood that the zones can be provided by various switches, such as Fibre Channel switches. It is also understood that direct connections to the intelligent switch 902 can be provided.

The first and second zones 916, 918 are coupled to various ports on the intelligent switch 902 to provide connectivity to various virtual targets VTs. In the illustrated embodiment, the first zone 916 is coupled to virtual targets one through four (VT 1 to VT 4) and the second zone 918 is coupled to virtual targets VT 5 to VT 8. As described above, this can be referred to as the front end.

The masking and mapping module 910 and virtual volume 908 provide connectivity to the virtual initiators 906 (VI 1 to VI 8), which are coupled to third and fourth (backend) zones 920, 922. In the illustrated embodiment, VI 1 to VI 4 are connected to the third zone 920 and VI 5 to VI 8 are coupled to the fourth zone 922.

A storage array 922 is coupled to the third and fourth zones 920, 922 via various ports 926. In the illustrated embodiment, first and second ports (Port 1 and Port 2) are coupled to the third zone 920 and third and fourth ports (Port 3 and Port 4) are coupled to the fourth zone 922. The ports 926 on the array provide access to array storage 930 via a masking and mapping module 932.

It is understood that additional switches 950 providing further zones 952 can form a part of the system. In general, the system can include any practical number of switches, zones, arrays, etc.

In another aspect of the invention, a storage virtualization system running on intelligent storage area network (SAN) switches provides minimally disruptive data migration that avoids network re-wiring, re-zoning and re-provisioning. In one embodiment, data migration functionality is provided as described in detail below without requiring software being added to hosts. The inventive system utilizes what are referred to as "pass-through" logical units (LUNs), as described in more detail below. The pass through LUNs are mapped one-to-one to the storage elements (SEs) of the storage virtualization system.

It is understood that exemplary embodiments are shown and described in conjunction with storage virtualization systems and terms associated with the INVISTA system provided by EMC Corporation. It is understood that such terms are intended to facilitate an understanding of the invention to one of ordinary skill in the art and should be construed broadly to cover functionality of a storage virtualization system, without limitation to any particular system or vendor.

Before describing exemplary embodiments of the invention, some information is provided. So-called back-end storage, such as back-end storage 41 in FIG. 1, is storage that is visible to the storage virtualization application instance, e.g., Invista. The storage 41 is imported into the storage system to provide storage elements (SEs). Virtual volumes, such as virtual volume 908 of FIG. 9) can be formed from the storage elements and exposed to hosts.

In conventional storage systems, the host includes software (referred to as multi-pathing software e.g., PowerPath multi-pathing software of EMC Corporation) that recognizes, and takes into account, the same LUN can appear to as two different LUNs or on two different paths due to the nature of the storage system. For example, a host may recognize back end storage as Symmetrix storage, for example, via two direct paths exposed to it. Without software on the host, multipath software may believe that the Symmetrix storage is two different devices, one on each path. Multi-pathing software will make it appear to the host that this is in fact the same LUN. Normally, virtual volumes exposed through a storage virtualization system will have the characteristics of the storage virtualization system LUNs. In exemplary embodiments of the invention, storage virtualization system LUNs that have been composed as pass through LUNs will have the characteristics of the back-end storage elements from which they are constructed. Thus, in accordance with exemplary embodiments providing minimally disruptive data migration described below, storage can be imported into a storage virtualization system without being seen as multiples of the same storage, without the addition of software on the host.

In an exemplary embodiment, the pass though LUNs are provided as back end storage LUNs seen through the host that are exposed as frontend LUNs through the storage system with the same unique ID as the backend LUN, so that the host (and the multi-pathing software on it) associates the storage system device as just another path to the original device, and not as a new device. One could consider that the host is 'spoofed' into seeing the original device as the same device after importation. That is, the unique ID, e.g., WWN (world wide name), of a virtual volume presented to the host should be the same as the WWN of the actual backend storage element. While WWN of virtual initiators communicating with backend targets can be the same as the WWN of host initiators, in general they will not be the same.

The storage virtualization system using virtual initiators, can record properties of the back end storage to enable the storage virtualization system to respond to the host as if the responses were being issued by the actual back-end storage element. Once this logical path has been established, then using the data migration feature in the storage virtualization system, the data can be migrated off of the present backend storage to new backend storage. This migration is completely transparent to the host. While the host would 'see' a physical path and one or more virtual/logical paths, the 'real' path can be shut off. The storage virtualization system can then use the recorded properties of the (now) former backend storage to respond to the host.

Figure 28:
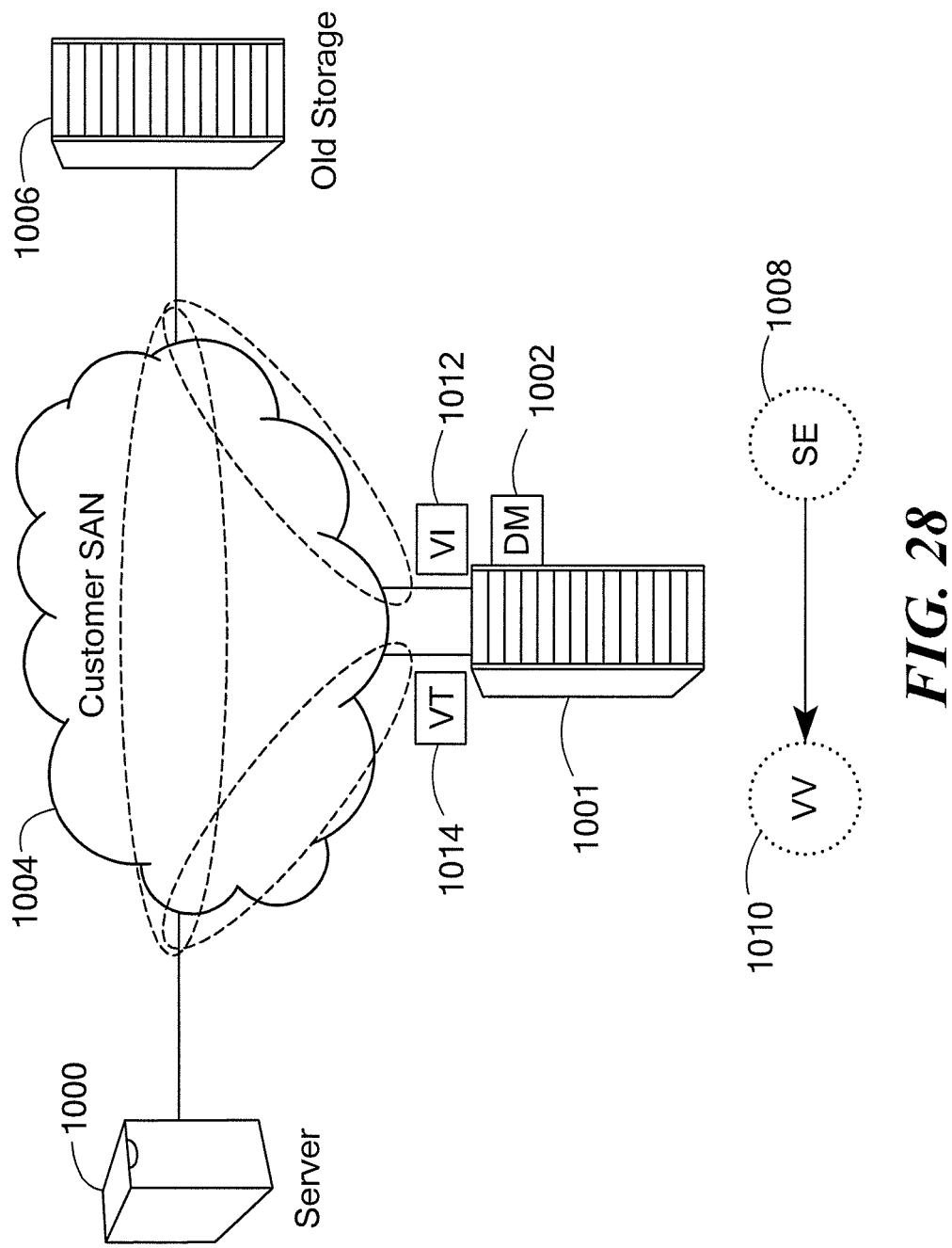
FIG. 28 is a schematic representation of minimally disruptive data migration at a given time.

FIG. 28 shows a simplified data migration example in accordance with exemplary embodiments of the invention. In general, in order to seamlessly plug-in into the existing SAN environment, the backend LUNs discovered by the storage virtualization system are recomposed as virtual volumes and exposed to the host through virtual targets (VTs). The identity and backend SCSI personality is retained by querying for storage array specific and LUN specific information during the discovery and subsequently, caching the acquired information. The commands for the storage virtualization system presented LUN are responded to with the data queried from the backend storage. In other words, such a LUN, referred to as a pass-through LUN, takes on the properties of the back-end storage element from which it is composed. Once host multi-pathing software recognizes the storage virtualization system presented LUN as another path to the existing pseudo device, the direct path from the host to the storage is disconnected causing all IOs to be routed through the logical path presented by the storage virtualization system. A data mobility/migration (DM) module can be invoked with the host presented LUN as the source and the target LUN to which the source is being moved as the destination.

Once the data migration session is established, in an exemplary embodiment, writes are mirrored to both the source and destination and the reads are serviced only through the source. The user commits the data migration operation (i.e. makes a conscious choice to send writes exclusively to the destination) at some point and de-provisions the backend source LUNs. The storage virtualization presented LUNs should retain the backend source LUN SCSI personality until the "pass through" property of the virtualization system presented LUNs is cleared by the user.

Referring to FIG. 28, a server 1000 is coupled to a storage virtualization application 1001 having a data mobility/migration module 1002 via a switch fabric 1004. Storage 1006 is coupled to the data mobility/migration module 1002 via the fabric 1004. The storage 1006 is imported to provide storage elements 1008 from which virtual volumes 1010 are created.

Initially, the backend storage/LUNs 1006 is provisioned for the virtual initiators 1012, which are zoned with the virtual target 1014. FIG. 27 shows an exemplary zoning implementation of virtual targets for a virtual volume and virtual targets for a storage array. Referring again to FIG. 28, the server 1000 is zoned with the virtual target 1014. The server initiator is zoned out from the target and the LUNs 1006 are provisioned to the server as pass through LUNs.

Figure 29:
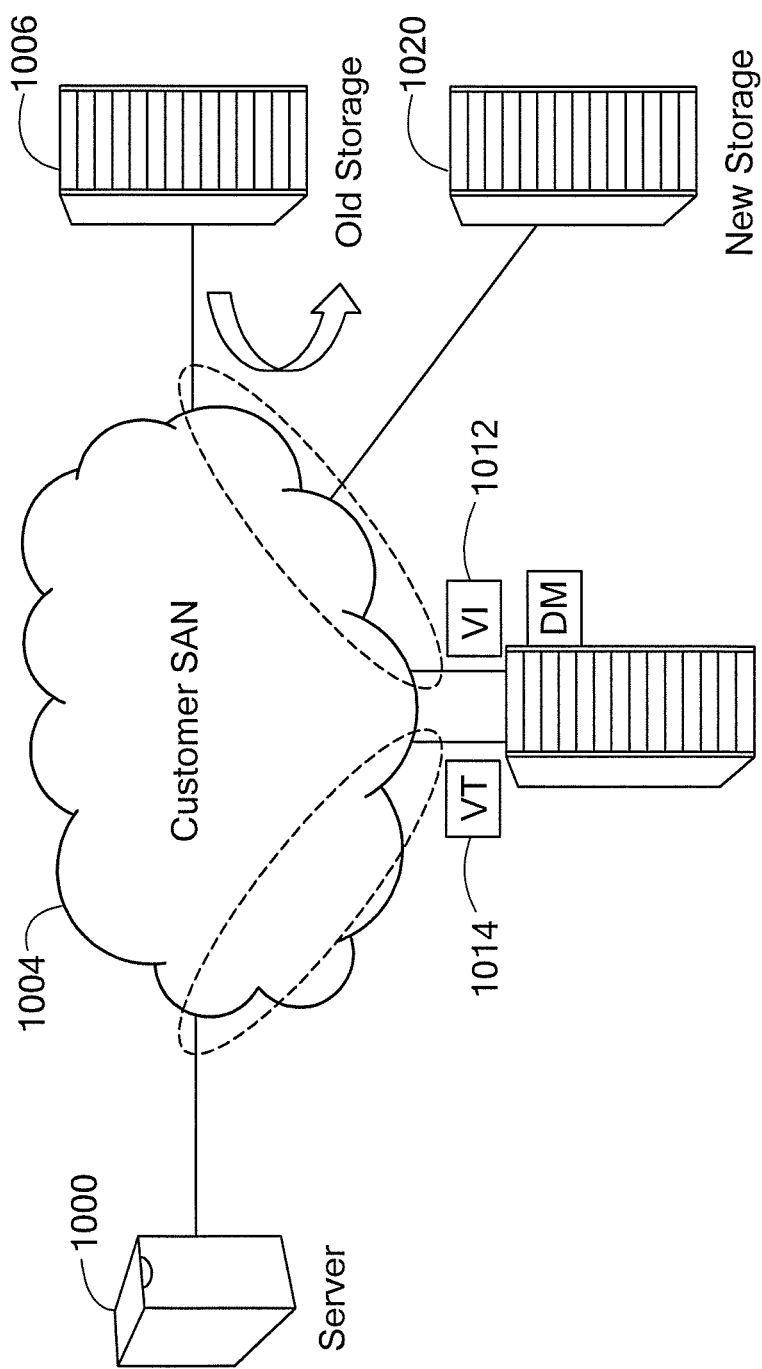
FIG. 29 is a schematic representation of minimally disruptive data migration at a further given time.
Figure 29A:
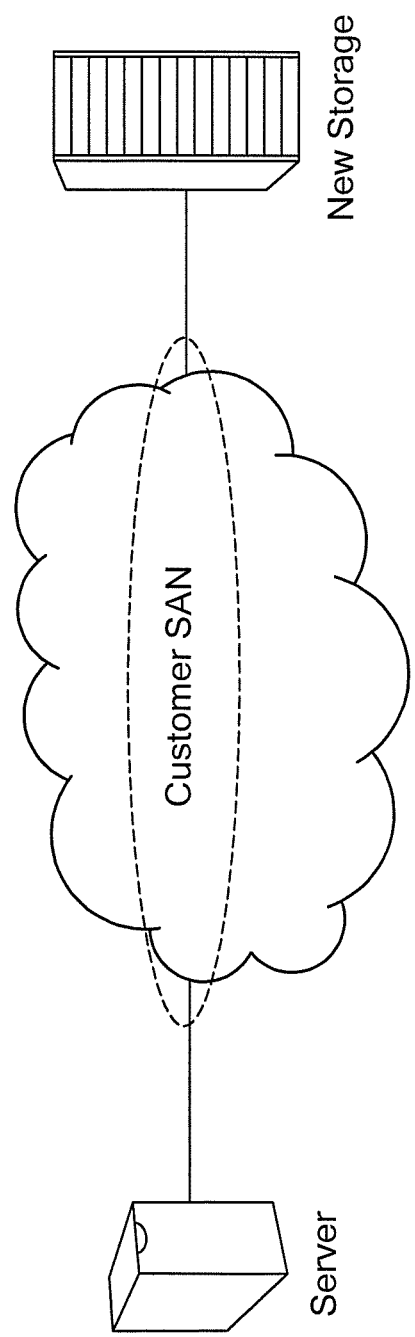
FIG. 29A is a schematic representation of minimally disruptive data migration after migration of the data.

As shown in FIG. 29, data in the original storage 1006 is migrated to new/remote storage 1020 transparently to the host. Once migration is complete, i.e., destination volume synchronization is complete, the server 1000 can be shut down to use the new storage, as shown in FIG. 29A. A user, such as a storage administrator, can then switch the volume from source to destination. For example, data in volumes located in New York City can be migrated to destination storage. Once migration is complete, the destination storage can be moved to New Jersey and the system readily reconfigured to update the new storage arrangement. While this arrangement requires downtime, the down time is limited to the time required to reconfigure for the New Jersey LUNs containing the migrated data. After data migration is complete, data on the original source volume can be erased. In other embodiments, the system can continue to operate in pass through mode.

Some additional detail on pass though LUN operation is now provided. In a backend information collection phase, the SCSI personality of the backend storage is collected by issuing SCSI Commands that yield its personality. The following choices can be considered in this work flow phase. Note, that these are not mutually exclusive and a combination of these choices (up to and including all choices) can be implemented. While SCSI devices are shown and described in exemplary embodiments, it is understood that other technologies and protocols can be used without departing from the present invention.

In one embodiment, a static information collection mechanism is used in which the information is collected by sending some commands to the backend storage at the point of discovery. The set of commands to be issued to the backend can include standard INQUIRY, INQUIRY for Vital Product Data Page 80h, INQUIRY for Vital Product Data Page 83h, READ_CAPACITY and certain other vendor unique commands as deemed appropriate for the back-end array and storage element for which information is collected.

In another embodiment, information collection through monitoring mechanism is used in which the information about what responses the backend array sends to the host is collected via passive observation of commands issued by the host to the actual back-end array. In this implementation, the VT WWN duplicates the WWN of the physical port of the storage array exposed to the host and the VI WWN duplicates the host physical port WWN. The slow path commands issued by the host are transmitted to the backend and the responses are intercepted, the data from these is copied and the responses are transmitted back to the host. This allows collection of the backend array SCSI personality by determining what exactly the host is sending. To ensure that the entire gamut of SCSI Commands for which data is required by the host is collected, discovery-type applications could be run on the host (e.g., ioscan for HPUX hosts or cfgmgr for AIX hosts).

In another embodiment, a self-learning pass-through information collection mechanism is used. An instance of the storage virtualization application functions as a pass through to the backend storage array. Thus, when the host sends SCSI commands that query the SCSI personality, these are issued to the backend. The information from the response coming back is collected and then passed onto the host. This repository of SCSI commands and their responses is collected to be used in case the commands are repeated.

The above, assumes that the virtual initiators (VIs) are registered with the same initiator type as that of the actual initiator. Note, since command responses change based on the registered initiator type, it may be necessary to limit the migration function to one initiator type at a time.

A transfer phase corresponds to collecting the information from the backend and ensuring that the front-end has access to it. This is the information that has been collected in the prior phase.

In one embodiment, information is collected in a flat file. It is understood that the backend information collection phase described above yields information about the responses that the backend will issue to the host. The responses from the backend for the issued slow path commands can be stored in a flat file. This is a combination of Array/Target/LUN information.

In another embodiment, information is collected via an IOCTL query mechanism. For example, FlareX could function as the repository for the backend array information. TCD could query for this backend interface by issuing an IOCTL to FlareX.

A frontend response phase utilizes the data obtained from the transfer phase and responds appropriately to host queries. In one embodiment, in order to achieve appropriate responses, the host is registered using a new initiator type called "pass-through". In this mode, TCD, upon figuring this initiator type, uses the appropriate mechanism implemented for the transfer phase to return the appropriate response. Note that the appropriate response should be returned for commands that have not been executed.

In a backend mimicking phase, the original backend array has been disconnected and the migration of data has been accomplished. However, the personality of the former array needs to be maintained. This can be achieved by informing the appropriate driver that the commands should not be issued to the backend. The expectation is that the IT Nexus will be deregistered (after the host is taken down) for the migration and then reconfigured to use the new array.

In conventional data migration systems, a volume is switched from source to destination automatically after the destination is completely synchronized with the source. However, with pass-through LUNs, in accordance with exemplary embodiments, if the switch over happens automatically, then the SCSI commands will be routed to the destination LUN which causes multipathing software to think it lost access to the original device and a new device has shown up. In order to avoid that kind of disruption to the host, in an exemplary embodiment manual control is used to switch over is provided in the user interface (referred to as the user "committing" the migration), so that the switch over happens only on user action, after the user has verified the integrity of the data on the destination or/and the host is disconnected from the storage virtualization application. In addition, the user interface should prevent or warn the user if an admin action is being performed when at least one initiator in the virtual frame is logged into the VT.

In an exemplary embodiment, in order to spoof the initiator and target WWNs, the storage virtualization application first needs to discover the SAN and present the initiators and targets to enable the user to select the initiator-target pairs to be spoofed. Depending on the initiator-target pairs, corresponding VIs and VTs can be created. The user might choose all LUNs or a subset of LUNs to be presented to the host through the storage virtualization application and accordingly configure the virtual frames. If the user chooses to present all the LUNs, the user interface can be modified to automatically import the SEs, create volumes, and configure the virtual frames.

Figure 30:
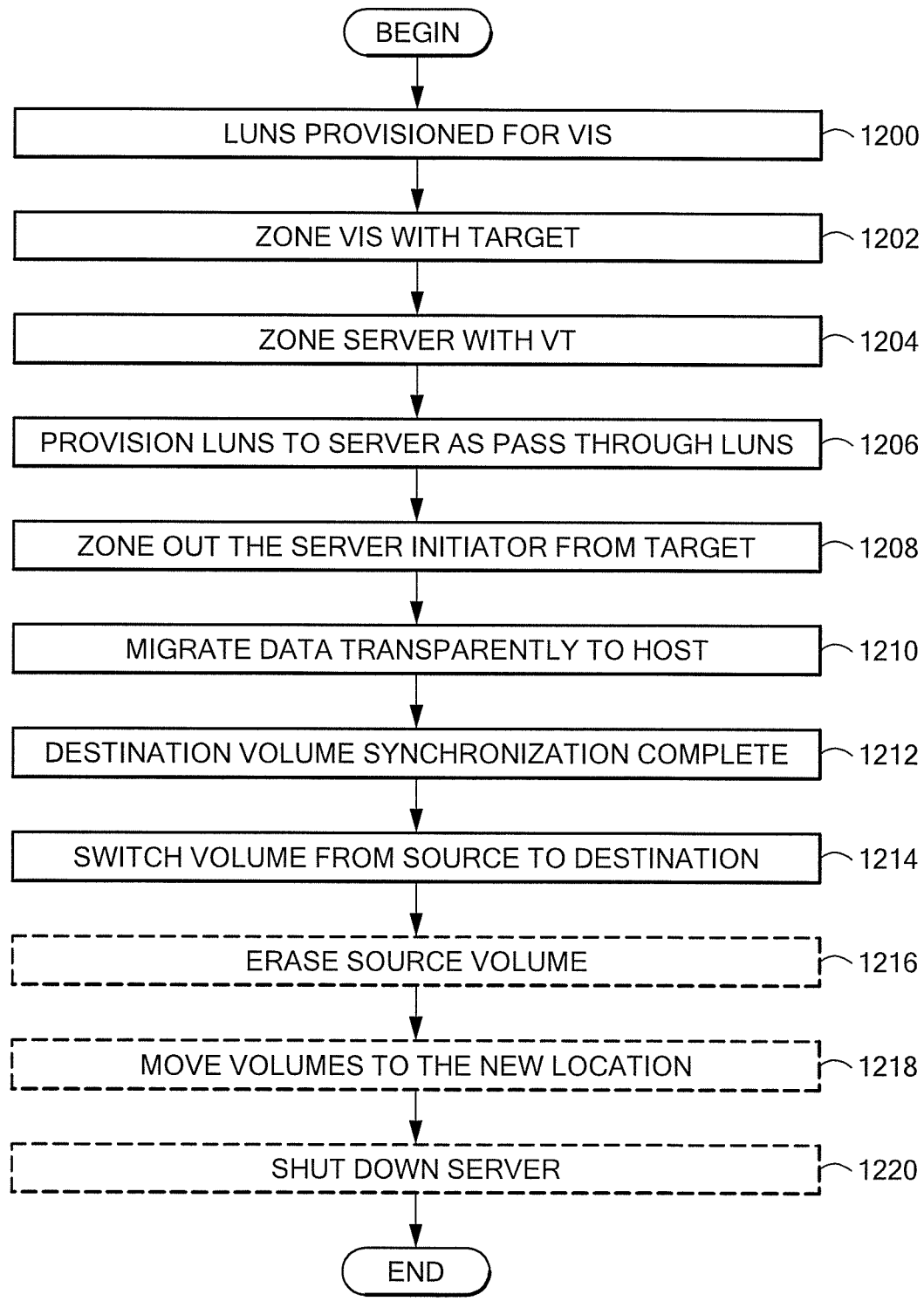
FIG. 30 is a flow diagram showing an exemplary sequence of steps for minimally disruptive data migration.

FIG. 30 shows an exemplary sequence of steps to provide minimally disruptive data migration in accordance with exemplary embodiments of the invention. In step 1200, LUNs are provisioned to VIs. In step 1202 VIs are zoned with targets and in step 1204 the server is zoned with a virtual target. The LUNs are then provisioned to the server as pass through LUNs in step 1206. In step 1208, the server initiator is zoned out from the target.

In step 1210, data migration is performed transparently to the host until the destination volume is fully synchronized with the source volume in step 1212. In step 1214, the volume is switched from source to destination. In an exemplary embodiment, the switch is performed manually. In optional step 1216, the source volume is erased and can be used as new storage.

In optional step 1218, the migrated volumes can be physically moved to a new location. Once moved, the volumes can be easily reconnected to the system. In optional step 1220, the server is shut down to enable connection of storage as desired In other embodiments, the user can keep running with new array medium but retain the old array personality.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising: migrating data in a storage virtualization environment from a backend LUN to a destination storage using a data migration module stored in a device coupled to a host by a switch fabric, using the data migration module comprising:
    collecting information on a personality of the backend LUN by collecting responses from the backend LUN to Small Computer System Interface (SCSI) commands issued from the host to the backend LUN while the host is coupled to the backend LUN by the switch fabric in a direct path;
    presenting a virtualization of the backend LUN to include the personality of the backend LUN to the host, using the collected information, through a virtual target at the device using a first path through the switch while the host is coupled to the backend LUN by the switch fabric in the direct path;
    disconnecting the host from the direct path to the backend LUN while a destination storage is coupled to the device by the switch fabric; and
    migrating data from the backend LUN to the destination storage transparently to the host after disconnecting the host from the direct path to the backend LUN.

2. The method of claim 1, wherein the backend LUN is identified with the same unique ID for both the direct path to the host and the virtual target.

3. The method of claim 1, wherein collecting information includes static information collection.

4. The method of claim 1, wherein collecting information includes information collection through monitoring.

5. The method of claim 1, wherein collecting information includes self-learning the personality of the backend LUN.

6. The method of claim 1, further comprising persistently storing the collected information on the backend LUN.

7. The method of claim 6, further comprising utilizing, after the backend LUN is disconnected, the collected information on the backend LUN to present to the host a personality identical to that of the backend LUN and writing data to the destination storage.

8. The method of claim 1, further comprising collecting the information on the backend logical unit (LUN) by a virtual initiator.

9. The method of claim 1, further comprising removing the backend LUN after completion of the data migration to the destination storage.

10. The method of claim 1, further comprising moving the destination storage to a remote location.

11. The method of claim 1, further comprising, during the data migration, mirroring writes to the backend LUN and the destination storage and servicing reads only through the backend LUN.

12. The method of claim 1, further comprising retaining a personality of the backend LUN until cleared by a user.

13. An article, comprising:
    a non-transitory machine-readable medium that stores executable instructions to migrate data in a storage virtualization environment from a backend logical unit (LUN) to a destination storage, a host being coupled to a device comprising the non-transitory machine-readable medium using a switch fabric, the backend LUN being coupled to the host using the switch fabric to form a direct path, a destination storage being coupled to the device using the switch fabric, the instructions causing a machine to:
        collect information on a personality of the backend LUN by collecting responses to Small Computer System Interface (SCSI) commands issued from the host to the backend LUN while the host is coupled to the backend LUN by the switch fabric in the direct path;
        present a virtualization of the backend LUN to include the personality of the backend LUN to the host, using the collected information, through a virtual target at the device using a first path through the switch fabric while the host is coupled to the backend LUN by the switch fabric in the direct path;
        disconnect the host from the direct path to the backend LUN while a destination storage is coupled to the device by the switch fabric;
        migrate data from the backend LUN to the destination storage transparently to the host after disconnecting the host from the direct path.

14. The article according to claim 13, wherein the backend LUN is identified with the same unique ID for both the direct path to the host and the virtual target.

15. The article according to claim 13 wherein the instructions causing the machine to collect information comprises instructions causing the machine to self-learn.

16. The article according to claim 13, further comprising instructions causing the machine to:
    persistently store the collected information on the backend LUN, and
    utilize, after the backend LUN is disconnected, the collected information on the backend LUN to present to the host a personality identical to that of the prior storage and writing data to the destination storage.

17. The article according to claim 13, further comprising instructions causing the machine to collect the information on the backend logical unit (LUN) by a virtual initiator.

18. A system, comprising:
- a host coupled to a device comprising a data migration module in a storage virtualization environment using a switch fabric;
- a backend logical unit (LUN) coupled to the host using the switch fabric to form a direct path, the backend LUN being coupled to the device using the switch fabric;
- a destination storage coupled to the device using the switch fabric; and
- wherein the data migration module is configured to:
    - collect information on a personality of the backend LUN by collecting responses from the backend LUN to Small Computer System Interface (SCSI) commands issued from the host to the backend LUN while the host is coupled to the backend LUN by the switch fabric in the direct path;
    - present a virtualization of the backend LUN to include the personality of the backend LUN to the host, using the collected information, through a virtual target at the device using a first path though the switch fabric while the host is coupled to the backend LUN by the switch fabric in the direct path;
    - disconnect the host from the direct path to the backend LUN while a destination storage is coupled to the device by the switch fabric; and
    - migrate data from the backend LUN to the destination storage transparently to the host after disconnecting the host from the direct path.

19. The system according to claim 18, wherein the backend LUN is identified with the same unique ID for both the direct path to the host and the virtual target.

20. The system according to claim 18, wherein the collected information on the backend LUN is stored persistently to enable utilization, after the backend LUN is disconnected, of the collected information on the backend LUN to present to the host a personality identical to that of the prior storage and writing data to the destination storage.

* * * * *